United States Patent
Ramani et al.

(10) Patent No.: US 9,400,778 B2
(45) Date of Patent: Jul. 26, 2016

(54) SYSTEM FOR IDENTIFYING TEXTUAL RELATIONSHIPS

(75) Inventors: Senthil Ramani, Bangalore (IN); Malharrao Mujumdar, Maharashtra (IN); Venkatraman Vaidhyanathan, Bangalore (IN); Reshma Nuggehally, Bangalore (IN); Kunal Verma, Sunnyvale, CA (US); Reymonrod Vasquez, San Jose, CA (US); Santhosh Kumar Shivaram, Bangalore (IN); Venkatesh Subramanian, Bangalore (IN); Sumit Dayal, Bangalore (IN); Alex Kass, Palo Alto, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1126 days.

(21) Appl. No.: 13/325,596

(22) Filed: Dec. 14, 2011

(65) Prior Publication Data
US 2012/0197631 A1    Aug. 2, 2012

(30) Foreign Application Priority Data

Feb. 1, 2011   (IN) .............................. 291/CHE/2011

(51) Int. Cl.
*G06F 17/27*    (2006.01)

(52) U.S. Cl.
CPC ........ *G06F 17/2755* (2013.01); *G06F 17/2785* (2013.01); *G06F 17/2795* (2013.01)

(58) Field of Classification Search
CPC ... G06F 17/277; G06F 17/2785; G06F 17/27; G06F 17/3061
USPC .............................. 707/767, 728; 704/9, 275
See application file for complete search history.

(56) References Cited

U.S. PATENT DOCUMENTS

| | | |
|---|---|---|
| 5,369,575 A | 11/1994 | Lamberti et al. |
| 5,774,833 A | 6/1998 | Newman |
| 5,995,920 A | 11/1999 | Carbonell et al. |

(Continued)

FOREIGN PATENT DOCUMENTS

| | | |
|---|---|---|
| CN | 101017432 A | 8/2007 |
| EP | 1 672 547 A1 | 6/2006 |
| EP | 2 362 333 A1 | 8/2011 |

OTHER PUBLICATIONS

International Preliminary Report on Patentability issued in corresponding PCT application No. PCT/US2012/022176 dated Aug. 15, 2013 (6 pgs).

(Continued)

*Primary Examiner* — Richemond Dorvil
*Assistant Examiner* — Mark Villena
(74) *Attorney, Agent, or Firm* — Brinks Gilson & Lione

(57) ABSTRACT

A computer-implemented method identifies textual statement relationships. Textual statement pairs including a first and second textual statement are identified, and parsed word group pairs are extracted from first and second textual statements. The parsed word groups are compared, and a parsed word score for each statement pair is calculated. Word vectors for the first and second textual statements are created and compared. A word vector score is calculated based on the comparison of the word vectors for the first and second textual statements. A match score is determined for the textual statement pair, with the match score being representative of at least one of the parsed word score and the word vector score.

29 Claims, 10 Drawing Sheets

(56) References Cited

U.S. PATENT DOCUMENTS

| | | | |
|---|---|---|---|
| 6,139,201 A | 10/2000 | Carbonell et al. | |
| 6,167,370 A | 12/2000 | Tsourikov et al. | |
| 6,343,297 B1 | 1/2002 | D'Anjou et al. | |
| 6,510,425 B1 | 1/2003 | Okamoto et al. | |
| 6,681,383 B1 | 1/2004 | Pastor et al. | |
| 6,715,130 B1 | 3/2004 | Eiche et al. | |
| 6,886,115 B2 | 4/2005 | Kondoh et al. | |
| 7,111,076 B2 | 9/2006 | Abjanic et al. | |
| 7,146,422 B1 | 12/2006 | Marlatt et al. | |
| 7,337,102 B2 | 2/2008 | Mosterman | |
| 7,500,185 B2 | 3/2009 | Hu | |
| 7,536,711 B2 | 5/2009 | Miyashita et al. | |
| 7,593,891 B2 | 9/2009 | Kornegay et al. | |
| 7,647,349 B2 | 1/2010 | Hubert et al. | |
| 7,694,222 B2 | 4/2010 | Steen et al. | |
| 7,725,923 B2 | 5/2010 | Miyashita et al. | |
| 7,742,939 B1* | 6/2010 | Pham | 705/7.39 |
| 7,752,094 B2 | 7/2010 | Davidson et al. | |
| 7,769,570 B2 | 8/2010 | Mosterman | |
| 7,774,743 B1 | 8/2010 | Sanchez et al. | |
| 7,877,737 B2 | 1/2011 | Austin et al. | |
| 7,975,220 B2 | 7/2011 | Hattori | |
| 8,190,628 B1* | 5/2012 | Yang et al. | 707/767 |
| 8,645,391 B1* | 2/2014 | Wong et al. | 707/748 |
| 2002/0065857 A1 | 5/2002 | Michalewicz et al. | |
| 2002/0147763 A1 | 10/2002 | Lee et al. | |
| 2002/0165717 A1 | 11/2002 | Solmer et al. | |
| 2002/0184397 A1 | 12/2002 | Cooper | |
| 2003/0149692 A1 | 8/2003 | Mitchell | |
| 2003/0172135 A1 | 9/2003 | Bobick et al. | |
| 2003/0220853 A1 | 11/2003 | Back et al. | |
| 2004/0024583 A1* | 2/2004 | Freeman | 704/4 |
| 2004/0025110 A1 | 2/2004 | Hu | |
| 2004/0030540 A1 | 2/2004 | Ovil et al. | |
| 2004/0034651 A1 | 2/2004 | Gupta et al. | |
| 2004/0039734 A1 | 2/2004 | Judd et al. | |
| 2004/0083092 A1 | 4/2004 | Valles | |
| 2004/0153992 A1 | 8/2004 | Molina-Moreno et al. | |
| 2004/0215443 A1 | 10/2004 | Hatton | |
| 2005/0108001 A1 | 5/2005 | Aarskog | |
| 2005/0216882 A1 | 9/2005 | Sundararajan et al. | |
| 2006/0020473 A1* | 1/2006 | Hiroe et al. | 704/275 |
| 2006/0041579 A1 | 2/2006 | Miyashita et al. | |
| 2006/0085451 A1 | 4/2006 | Pal et al. | |
| 2006/0085489 A1 | 4/2006 | Tomic et al. | |
| 2006/0190804 A1 | 8/2006 | Yang | |
| 2006/0265646 A1 | 11/2006 | Girolami | |
| 2006/0282266 A1 | 12/2006 | Lopez-Barquilla et al. | |
| 2007/0106493 A1* | 5/2007 | Sanfilippo et al. | 704/9 |
| 2007/0106499 A1 | 5/2007 | Dahlgren et al. | |
| 2007/0143329 A1 | 6/2007 | Vigen | |
| 2007/0244859 A1 | 10/2007 | Trippe et al. | |
| 2007/0294230 A1 | 12/2007 | Sinel et al. | |
| 2008/0033897 A1 | 2/2008 | Lloyd | |
| 2009/0083677 A1 | 3/2009 | Darwish et al. | |
| 2009/0138793 A1 | 5/2009 | Verma et al. | |
| 2009/0144609 A1* | 6/2009 | Liang et al. | 715/230 |
| 2010/0063796 A1* | 3/2010 | Rehberg et al. | 704/9 |
| 2011/0112823 A1* | 5/2011 | Ylonen | 704/9 |
| 2011/0153311 A1* | 6/2011 | Bogl et al. | 704/9 |
| 2011/0251839 A1* | 10/2011 | Achtermann et al. | 704/9 |
| 2011/0276322 A1* | 11/2011 | Sandor et al. | 704/9 |
| 2011/0289081 A1* | 11/2011 | Willits | 707/728 |
| 2011/0301955 A1* | 12/2011 | Byrne et al. | 704/251 |
| 2012/0123986 A1* | 5/2012 | Narendra et al. | 706/46 |

OTHER PUBLICATIONS

International Search Report and Written Opinion of the International Search Authority issued on Aug. 7, 2012 in PCT Appln. No. PCT/US2012/022176 (11 pgs).

Patent Examination Report No. 1, dated Apr. 16, 2014, pp. 1-3, issued in Australia Patent Application No. 2012212638, IP Australia, Woden, ACT, Australia.

Patent Examination Report No. 2, dated Aug. 6, 2014, pp. 1-2, issued in Australia Patent Application No. 2012212638, IP Australia, Woden, ACT, Australia.

Communication pursuant to Rules 161(1) and 162 EPC (EPO Form 1226AA) issued on Oct. 2, 2013 in corresponding EP Appln. No. 12702131.9 (2 pgs).

Boddu, R. et al., "RETNA: From Requirements to Testing in a Natural Way," Proceedings of the 12th IEEE International Requirements Engineering Conference, 2004, 10 pages.

Alani, H. et al., "Automatic Ontology-Based Knowledge Extraction from Web Documents," IEEE Intelligent Systems, 2003, pp. 14-21.

Anandha Mala, G.S. et al., "Automatic Construction of Object-Oriented Design Models [UML Diagrams] from Natural Language Requirements Specification," PRICAI, 2006, pp. 1155-1159.

Anderson, T. et al., "On Formal Support for Industrial-Scale Requirements Analysis," Department of Computing Science, University of Newcastle upon Tyne, UK, pp. 426-451.

ANTLR, URL: printed from the internet at <http://www.antlr.org>, on May 18, 2010, 2 pages.

"Apache OpenNLP," The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., "Description Logics," Theoretical Computer Science, TU Dresden, Germany, 40 pages.

Baader, F. et al., Chapter 3, Description Logics, Elsevier, 2007, 47 pages.

Baral, C. et al., "Using AnsProlog with Link Grammar and WordNet for QA with deep reasoning," 9th International Conference on Information Technology, IEEE Computer Society, 2006, 4 pages.

Basili, V. R. et al., "Comparing the Effectiveness of Software Testing Strategies," IEEE Transactions on Software Engineering, vol. SE-13, No. 12, 1987, pp. 1278-1296.

Basler, M. et al., "Introducing the Java Pet Store 2.0 Application," 2007, printed from the internet at <http://java.sun.com/jsp.utils/PrintPage.jsp?url=http%3A%2F%2Fjava.sun.com%2Fdevelo . . . > on Aug. 17, 2011, 10 pages.

Biswal, B. N. et al., "A Novel Approach for Scenario-Based Test Case Generation," International Conference on Technology, IEEE Computer Society, 2008, pp. 244-247.

Boehm, B. et al., "Identifying Quality-Requirement Conflicts," IEEE Software, vol. 13, No. 2, IEEE Computer Society Press, Los Alamitos, 1996, pp. 25-35.

Boehm, B. W., "Understanding and Controlling Software Costs," IEEE Transactions on Software Engineering, vol. 14, No. 10, 1988, pp. 1462-1477.

Borland Software Corporation, "Mitigating Risk with Effective Requirements Engineering," Apr. 2005, 14 pages.

Ravenflow website, 2005-2006, http://www.ravenflow.com, last accessed on Jan. 30, 2008, 71 pages.

Crain, A., "The Simple Artifacts of Analysis and Design," IBM Software Group, 2004, printed from the internet at <http://www.ibm.com/developerworks/rational/library/4871.html> on Aug. 18, 2011, 7 pages.

Curtis, Dr. B., Best Practices for Requirements Development and Management, Borland Software Corporation, 2005, 36 pages.

Dahab, M. Y. et al., "TextOntoEx: Automatic ontology construction from natural English text," Expert Systems with Applications, vol. 34, 2008, pp. 1474-1480.

Daneva, M., "ERP Requirements Engineering Practice: Lessons Learned," IEEE Software, 2004. pp. 26-33.

Daneva, M., "Establishing Reuse Measurement Practices in SAP Requirements Engineering," IEEE, 2000, 10 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

de Marneffe, M-C. et al., "Stanford typed dependencies manual," Sep. 2008 (Revised for Stanford Parser v. 1.6.2, 2010), 20 pages.

Deeptimahanti, D. K. et al., "An Automated Tool for Generating UML Models from Natural Language Requirements," IEEE/ACM

(56) References Cited

OTHER PUBLICATIONS

International Conference on Automated Software Engineering, IEEE Computer Society, 2009, pp. 680-682.

Deeptimahanti, D. K. et al., "Semi-automatic Generation of UML Models from Natural Language Requirements," India Software Engineering Conference, 2011, pp. 165-174.

Dickinson, I., "Jena Ontology API," 2009, printed from the internet at <http://jena.sourceforge.net/ontology/> on Feb. 21, 2012, 29 pages.

Duan, M., "Ravenflow Seeks to Eliminate Software Ambiguity, Errors," Silicon Valley / San Joes Business Journal, Nov. 17, 2006, 2 pages.

Egyed, A., "Scalable Consistency Checking between Diagrams—The ViewIntegra Approach," Proceedings of the 16th IEEE International Conference on Automated Software Engineering, USA: San Diego, 2001, 4 pages.

Fantechi, A. et al., "A Content Analysis Technique for Inconsistency Detection in Software Requirements Documents," Dipartimento di Sistemi e Informatica Universita degli Studi di Firenzi, Italy, 12 pages.

Glass, R. L., *Facts and Fallacies of Software Engineering*, Addison Wesley, copyright 2003, 150 pages.

Grunbacher, P. et al., "Reconciling Software Requirements and Architectures: The CBSP Approach," Proceedings of the 5th IEEE International Symposium on Requirements Engineering, Toronto, Canada, 2001, 10 pages.

Hayes, J. H. et al., "Advancing Candidate Link Generation for Requirements Tracing: The Study of Methods," IEEE Transactions on Software Engineering, vol. 32, No. 1, 2006, pp. 4-19.

Hooks, I. F., "Managing Requirements," Crosstalk, The Journal of Defense Software Engineering, vol. 17, No. 8, Aug. 2004, 8 pages.

IBM DeveloperWorks: Rational Software Architect, printed from the internet at <http://www.ibm.com/developerworks/rational/products/rsa/> on Aug. 18, 2011, 2 pages.

IEEE Recommended Practice for Architectural Description of Software-Intensive Systems, The Institute of Electrical and Electronics Engineering, Inc., 2000, 29 pages.

IEEE Recommended Practice for Software Requirement Specifications, IEEE/ANSI Standard 830-1998, Institute of Electrical and Electronics Engineers, 1998, 39 pages.

"IEEE Standard for Software and System Test Documentation," IEEE Standard 829-2008, IEEE Computer Society, 2008, 132 pages.

IEEE Standard Glossary of Software Engineering Terminology, IEEE Std. 610.12-1990, Standards Coordinating Committee of the Computer Society of the IEEE, New York, Sep. 1990, 84 pages.

Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.

Information Technology—Open Distributed Processing—Reference model: Architecture, International Standard, ISO/IEC 10746-3, 1st Ed. 1996, 68 pages.

Information technology—Open Distributed Processing—Reference model: Foundations ISO/IEC 10746-2, 1st Ed., 1996, 28 pages.

Jain, P. et al., "Automated Review of Natural Language Requirements Documents: Generating Useful Warnings with User-extensible Glossaries Driving a Simple State Machine," ISEC '09, ACM, 2009, pp. 37-45.

Jena—A Semantic Web Framework for Java, printed from the internet at <http://jena.sourceforge.net>, last retrieved on Oct. 10, 2008, 1 page.

Jirapanthong, W. et al., "XTraQue: traceability for product line systems," Software and Systems Modeling, vol. 8, 2009, pp. 117-144.

Keshav, R. et al., "Towards a Taxonomy of Architecture Integration Strategies," the 3rd International Software Architecture Workshop, 1998, 4 pages.

Kof, L., et al., "Faster from Requirements Documents to System Models: Interactive Semi-Automatic Translation with a tool that is learning on the fly," Requirements Engineering Efficiency Workshop, 17th International Working Conference on Requirements Engineering: Foundation for Software Quality, 2011, 41 pages.

Kosindrdecha, N. et al., "A Test Generation Method Based on State Diagram," Journal of Theoretical and Applied Information Technology, 2010, pp. 28-44.

Kruchten, P., "An Ontology of Architectural Design Decisions in Software-Intensive Systems," 2004, 8 pages.

Kruchten, P., "Architectural Blueprints—The "4+1" View Model of Software Architecture," IEEE Software, vol. 12, No. 6, 1995, 15 pages.

Lami, G. et al., "An Automatic Tool for the Analysis of Natural Langauge Requirements," published as Technical Report 2004-TR-40, Consiglio Nazionale delle Ricerche, Instituto di Scienza e Tecnologie dell'Informazione 'A.Faedo', 2004, 21 pages.

Lami, G., "QuARS: A Tool for Analyzing Requirements," Software Engineering Measurement and Analysis Initiative, Technical Report, 2005, 46 pages.

Lau, K-K. et al., "A Taxonomy of Software Component Models," Proceedings of the 2005 31st EUROMICRO Conference on Software Engineering and Advanced Applications, IEEE, 2005, 8 pages.

Li, L. et al., "A Software Framework for Matchmaking Based on Semantic Web Technology," in WWW, 2003, pp. 331-339.

Li, Y. et al., "Sentence Similarity Based on Semantic Nets and Corpus Statistics," IEEE Transactions on Knowledge and Data Engineering, vol. 18, No. 8, 2006, pp. 1138-1150.

Litvak, B. et al., "Behavioral Consistency Validation of UML Diagrams," Proceedings of the First International Conference on Software Engineering and Formal Methods, IEEE Computer Society, 2003, 8 pages.

Liu, D. et al., "Natural Language Requirements Analysis and Class Model Generation Using UCDA," IEA/AIE, Springer-Verlag, 2004, pp. 295-304.

Maiden, N. A. et al., "Acquiring COTS Software Selection Requirements," IEEE Software, 1998, pp. 46-56.

Marcus, M. P. et al., "Building a Large Annotated Corpus of English: the Penn Treebank," Computational Linguistics, 1993, 22 pages.

Medvidovic, N. et al., "A Classification and Comparison Framework for Software Architecture Description Languages," IEEE Transactions on Software Engineering, vol. 26, No. 1, 2000, pp. 70-93.

Mihalcea, R. et al., "Corpus-based and Knowledge-based Measures of Text Semantic Similarity," in American Associate for Artificial Intelligence, 2006, 6 pages.

Miller, G. A., "Wordnet: A Lexical Database for English," Communications of the ACM, vol. 38, No. 11, 1995, pp. 39-41.

"Modeling," Software Development Times, Jun. 1, 2007, 2 pages.

Morisio, M. et al., "Definition and Classification of COTS: A Proposal," ICCBSS, Orlando, FL, 2002, 10 pages.

Nanduri, S. et al., "Requirements Validation via Automated Natural Language Parsing," Proceedings of the 28th Annual Hawaii International Conference on System Sciences, IEEE, 1995, pp. 362-368.

Nebut, C. et al., "Automatic Test Generation: A Use Case Driven Approach," IEEE Transactions on Software Engineering, vol. 32, No. 3, 2006, pp. 140-155.

Neill, C. J. et al., "Requirements Engineering: The State of the Practice," IEEE Software, IEEE Computer Society, vol. 20, No. 6, 2003, pp. 40-45.

OWL Web Ontology Language Overview, W3C, available from http://www.w3.org/TR/owl-features/, last retrieved on Oct. 10, 2008, 13 pages.

Phyu, A. L. L. et al., "Domain Adaptive Information Extraction Using Link Grammar and WordNet," Fifth International Conference on Creating, Connecting, and Collaborating through Computing, IEEE Computer Society, 2007, 7 pages.

Porter, M. F., "An Algorithm for Suffix Stripping," Program, vol. 14, No. 3, 1980, pp. 130-137.

"Raven Professional Includes Five New Modules," Computer Magazine, Nov. 2006, p. 85.

Raven Software, URL: available at www.ravensoft.com last retrieved Aug. 26, 2010, 1 page.

Robinson, W. N. et al., "Requirements Interaction Management," ACM Computing Surveys, vol. 35, No. 2, Jun. 2003, pp. 1-59.

(56) References Cited

OTHER PUBLICATIONS

Robinson, W. N. et al., "Requirements Interaction Management," Georgia State University, Department of Computer Information Systems Working Paper 99-7, Aug. 30, 1999, 68 pages.

RosettaNet website, 2012, printed from the internet at <http://www.rosettanet.org/> on Feb. 21, 2012, 2 pages.

Rubinstein, D., "Quoth the Ravenflow: Drag-and_Drop Nevermor: Requirments Suite Generates UML Diagrams from Plain Text," Software Development Times, Mar. 15, 2006, Issue No. 146, 1 page.

Ryan, K., "The Role of Natural Language in Requirements Engineering," IEEE, 1992, pp. 240-242.

Schindler, E., "Learning to Speak 'User'," Digital Producer Magazine, Mar. 2006, 2 pages.

Schmerl, B. et al., "AcmeStudio: Supporting Style-Centered Architecture Development," In Proc. 2004 International Conference on Software Engineering, Edinburgh, Scotland, 2004, 2 pages.

Schmidt, D., "Model-Driven Engineering," IEEE Computer Society, 2006, pp. 25-31.

Selic, B. "The Pragmatics of Model-Driven Development," IEEE Software, 2003, pp. 19-25.

Shahin, M. et al., "Improving Understandability of Architecture Design through Visualization of Architectural Design Decision," SHARK '10, ACM, 2010, 8 pages.

Sharma, V. S. et al., "Extracting High-Level Functional Design from Software Requirements," 16th Asia-Pacific Software Engineering Conference, IEEE Computer Society, 2009, pp. 35-42.

Sinha, A. et al., "Text2Test: Automated Inspection of Natural Language Use Cases," 2010 Third International Conference on Software Testing, Verification and Validation, IEEE Computer Society, 2010, pp. 155-162.

Skyway software, printed from the internet at <http://www.skywaysoftware.com/> on Aug. 22, 2011, 3 pages.

Sleator, D. D. et al., "Parsing English with a Link Grammar," CMU Technical Report, 1991, 93 pages.

Sleator, D. D. et al., "Parsing English with a Link Grammar," In Third International Workshop on Parsing Technologies, 1993, 14 pages.

Sleator, D., "Link Grammar License," 2005, printed from the internet at <http://www.link.cs.cmu.edu/link/license.html> on Feb. 21, 2012, 1 page.

Sleator, D., "Summary of Link Types," 1998, 7 pages.

Sneed, H. M., "Testing Against Natural Language Requirements," Seventh International Conference on Quality Software, IEEE Computer Society, 2007, 8 pages.

Soffer, P. et al., "Modelling Off-the-Shelf Information Systems Requirements: An Ontological Approach," Requirements Engineering, vol. 6, 2001, pp. 183-199.

Sutton, S. M. et al., "Text2Test: Automated Inspection of Natural Language Use Cases," IBM Search Report, Computer Science, 2009, 11 pages.

"The Declaration of Independence: Six Principles to Benefit You and Your Agile Organization," Better Software, www.StickMinds.com, Jun. 2006, pp. 24 and 36.

"The Phrase Parser," printed from the internet at <http://www.abisource.com/projects/link-grammar/dict/ph-explanation.html> on Feb. 21, 2012, 8 pages.

The Protege Ontology Editor and Knowledge Acquisition System, printed from the internet at <http://protege.stanford.edu/> on Aug. 16, 2011, 2 pages.

"The Stanford Parser: A statistical parser," The Stanford Natural Language Processing Group, printed from the internet at <http://nlp.stanford.edu/software/lex-parser.shtml> on Feb. 21, 2012, 6 pages.

Tolvanen, J-P. et al., "Defining Domain-Specific Modeling Languages to Automate Product Derivation: Collected Experiences," SPLC 2005, pp. 198-209.

van Lamsweerde, A. et al., "Managing Conflicts in Goal-Driven Requirements Engineering," IEEE Transactions on Software Engineering, Special Issue on Managing Inconsistency in Software Development, Nov. 1998, pp. 1-21.

Verma, K. et al., "Requirements Analysis Tool: A Tool for Automatically Analyzing Software Requirements Documents," ISWC 2008, Springer-Verlag, 2008, pp. 751-763.

"WebSphere Industry Content Packs accelerate Insurance, Banking, Telecom, Healthcare & Industrial PLM WebSphere BPM solutions," IBM Software, printed from the internet at <http://www-142.ibm.com/software/products/gb/en/inducontpack/> on Feb. 21, 2012, 5 pages.

Wiegers, K. E., Software Requirements, Chapters 1-13, Microsoft Press, Redmond, 2003, 262 pages.

Wiegers, K. E., Software Requirements, Chapters 14-Appendix D, Microsoft Press, Redmond, 2003, 278 pages.

Wilson, W. M. et al., "Automatic Quality Analysis of Natural Language Requirement Specification," NASA, The Goddard Space Flight Center's Software Assurance Technology Center, http://satc.gsfc.nasa.gov/support/PNSQC-_OCT96/phq.html, dated Oct. 1996, pp. 1-19.

YACC, URL: available at http://dinosaur.compilertools.net/yaac, last retrieved Apr. 29, 2010, 24 pages.

Yoo, J. et al., "A Formal Software Requirements Specification Method for Digital Nuclear Plant Protection Systems," The Journal of Systems and Software, vol. 74, 2005, pp. 73-83.

Young, R.R. 2000 Effective Requirements Practices, Addison-Wesley Longman Publishing Co, Inc. 2001, 387 pages.

Zachos, K. et al., "Inventing Requirements from Software: An Empirical Investigation with Web Services," in 16th IEEE International Requirements Engineering Conference, IEEE Computer Society, 2008, pp. 145-154.

Zamin, N., "Information Extraction using Link Grammar," 2009 World Congress on Computer Science and Information Engineering, IEEE Computer Society, 2008, pp. 149-153.

Baader, F. et al., "Description Logics," Reasoning Web. Semantic Technologies for Information Systems, 2009, 40 pages.

Brandozzi, M. et al., "Transforming Goal Oriented Requirement Specifications into Architecture Prescriptions," Proceedings STRAW '01, ICSE 2001, 8 pages.

Cunning, S. J. et al., "Test Scenario Generation from a Structured Requirements Specification," IEEE Conference and Workshop on Engineering of Computer-Based Systems, ecbs, 1999, 7 pages.

de Marneffe, M-C. et al., "Generating Typed Dependency Parses from Phrase Structure Parses," LRCE, 2006, 6 pages.

Fabbrini, F. et al., "The Linguistic Approach to the Natural Language Requirements Quality: Benefit of the use of an Automatic Tool," SEW '01 Proceedings of the 26th Annual NASA Goddard Software Engineering Workshop, 2001, 9 pages.

Fantechi, A. et al., "A Content Analysis Technique for Inconsistency Detection in Software Requirements Documents," WER, 2005, pp. 245-262.

Gnesi, S. et al., "An Automatic Tool for the Analysis of Natural Language Requirements," Comput. Syst. Sci. Eng., 2005, 13 pages.

Hall, J. G. et al., "Relating Software Requirements and Architectures using Problem Frames," Proceedings of the IEEE Joint International Conference on Requirements Engineering (RE '02), 2002, 8 pages.

Lin, D., "Dependency-Based Evaluation of MINIPAR," Text, Speech, and Language Technology 1, vol. 20, Treebanks, Part II, 2003, pp. 317-329.

Lin, D., "An Information-Theoretic Definition of Similarity," Proceedings of the 15th International Conference on Machine Learning 1, 1998, pp. 296-304.

Luisa, M. et al., "Market Research for Requirements Analysis Using Linguistic Tools," Requirements Engineering, vol. 9, No. 1, 2002, 26 pages.

Luo, L., "Software Testing Techniques: Technology Maturation and Research Strategy," Class Report for 17-939A, Institute for Software Research International, Carnegie Mellon University, 2009, 20 pages.

Mehta, N. R. et al., "Towards a Taxonomy of Software Connectors," In Proceedings of the 22nd International Conference on Software Engineering, 2000, pp. 178-187.

(56) References Cited

OTHER PUBLICATIONS

Offutt, J. et al., "Generating Tests from UML Specifications," U.S. National Science Foundation under grant CCR-98-04111 and Rockwell Collins, Inc., Robert Franc and Bernhard Rurape (Eds.), '99, LNCS 1723, 1999, pp. 416-429.

Paolucci, M. et al., "Semantic Matching of Web Services Capabilities," International Semantic Web Conference (ISWC), Sandinia, Italy, Jun. 9-12, 2002, pp. 333-347.

Pyysalo, S. et al., "Analysis of Link Grammar on Biomedical Dependency Corpus Targeted at Protein-Protein Interactions," JNLPBA '04 Proceedings of the International Joint Workshop on Natural Language Processing in Biomedicine and its Applications, 2004, pp. 15-21.

Rech, J. et al., "Intelligent Assistance in German Software Development: A Survey," IEEE Software, vol. 24, No. 4, 2007, pp. 72-79.

Zimmermann, O. et al., "Managing Architectural Decision Models with Dependency Relations, Integrity Constraints, and Production Rules," Journal of Systems and Software, vol. 82, No. 8, Aug. 2009, 36 pages.

Office Action for Chinese Patent Application No. 201280014286.8, Issued Jan. 20, 2016.

Gervasi, V. et al., "Reasoning About Inconsistencies in Natural Language Requirements," ACM Transactions on Software Engineering and Methodology, vol. 14, No. 3, Published Jul. 2005, pp. 277-330.

* cited by examiner

SYSTEM FOR IDENTIFYING TEXTUAL RELATIONSHIPS

PRIORITY CLAIM

This application claims the benefit of priority from Indian non-provisional patent application no. 291/CHE/2011 filed Aug. 5, 2011, and from Indian provisional patent application no. 291/CHE/2011 filed Feb. 1, 2011, both of which are incorporated by reference.

TECHNICAL FIELD

The present description relates generally to the field of requirement analysis and, more specifically, to the field of identifying technical requirements.

BACKGROUND

Enterprises, clients, and other companies ("enterprises") may wish to have hardware, software, or various combinations of hardware and software developed or implemented. Enterprises may have one or more requirements which each enterprise may wish to have represented or otherwise included in hardware and software implementations. Enterprises may, in some circumstances, contract with or hire one or more hardware or software providers or vendors to develop and implement desired hardware and software.

SUMMARY

A computer-implemented method identifies textual statement relationships. Textual statement pairs including a first and second textual statement are identified, and parsed word group pairs are extracted from first and second textual statements. The parsed word groups are compared, and a parsed word score for each statement pair is calculated. Word vectors for the first and second textual statements are created and compared. A word vector score is calculated based on the comparison of the word vectors for the first and second textual statements. A match score is determined for the textual statement pair, with the match score being representative of at least one of the parsed word score and the word vector score.

Other systems, methods, and features will be, or will become, apparent to one with skill in the art upon examination of the following figures and detailed description. It is intended that all such additional systems, methods, and features be included within this description, be within the scope of the disclosure, and be protected by the following claims.

BRIEF DESCRIPTION OF DRAWINGS

The system may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Large enterprise software implementations may be created, modified, and tailored to the specific needs of each particular enterprise. Software providers or other vendors may, where possible, create such software implementations for each enterprise based in part or entirely on, with, or using common software implementations or standard software packages which the software provider or vendor may have previously created or offered to other enterprises. Basing implementations on standard offerings may reduce costs and risks by leveraging past experience, and often by re-using assets, such as software or code.

Successfully employing parts of common software implementations and standard software packages in the creation of specifically tailored software implementations may shift a requirements-definition process from a pure elicitation process to one which has an element of gap analysis. In these situations, it may be important to understand the relationship between what the customer wants, and what the pre-defined offering can do.

To facilitate and systematize this process of applying a standard offering to an enterprise software need, it may be important to develop and maintain reference models, capability models, or process models ("process models"). An example of one such model may be a company's Business Process Repository. Process models may include reference capabilities and process model elements ("process model capabilities"), as well as reusable artifacts for a domain or industry. Industry-specific process models may capture processes and capabilities that are implemented repeatedly (with potentially large variations) in an industry or domain. They may represent standard processes (and variations) in different industries and domains.

Figure 1:
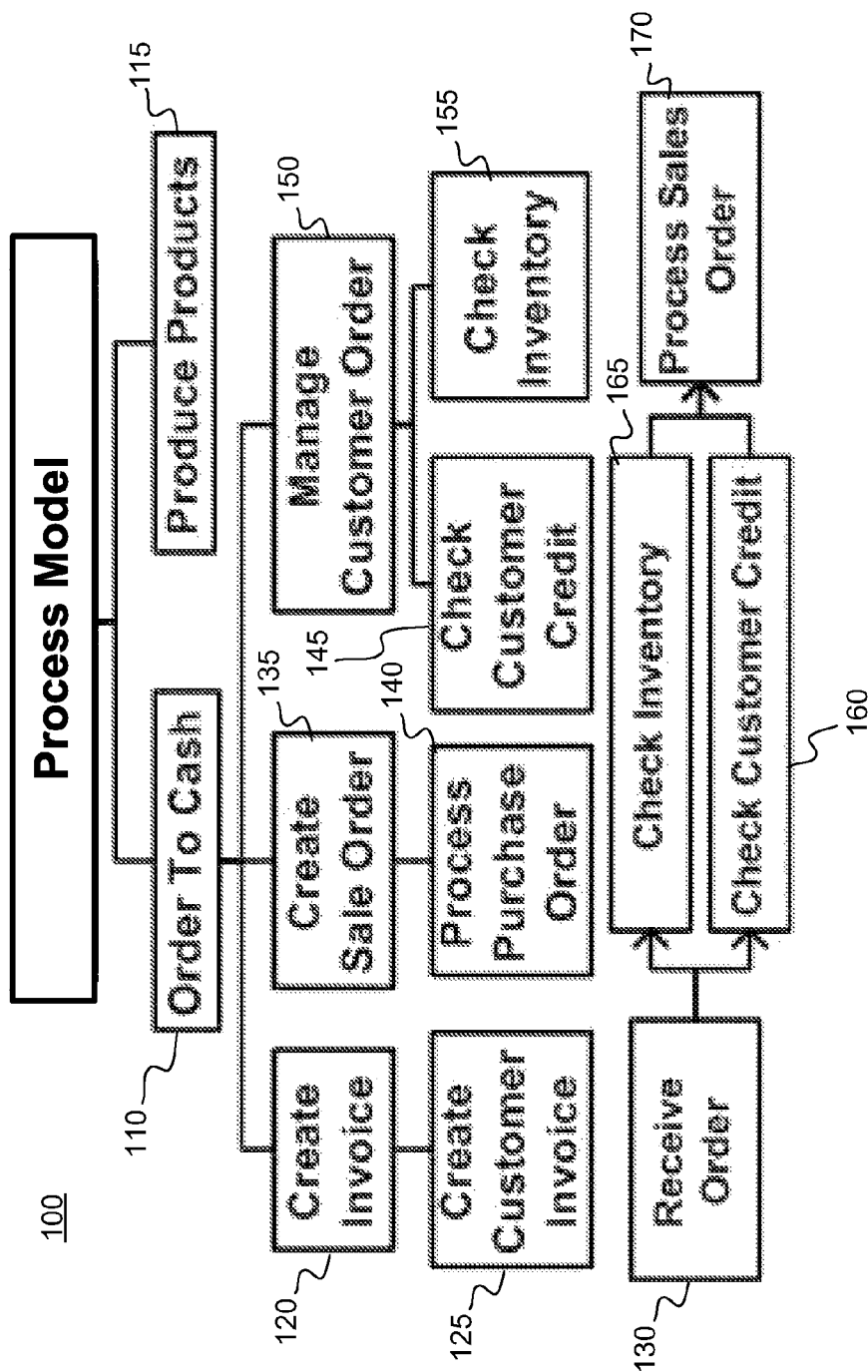
FIG. 1 shows an example of a process model that may be used in a system for identifying textual relationships.

FIG. 1 illustrates one example of a process model, which is based on an example Business Process Repository. The industry-specific process model 100 of FIG. 1 is a hierarchical model of process model capabilities, and may include one or more parent-child relationships. A capability may represent one or more functions in a business technical domain. At the highest-level of the process model 100 may include generic capabilities such as an "Order to Cash" capability 110 and a "Produce Products" capability 115. Each subsequent level of the process model 100 may have child capabilities, which are more detailed or granular functions, such as "Create Invoice" capability 120 and "Check Customer Credit" capability 145.

The children capabilities may be needed to implement the parent capability. For example, "Order to Cash" capability 110 may have sub-capabilities such as "Create Invoice" capability 120, "Create Sales Order" capability 135, and "Manage Customer Order" capability 150. In some systems, there may also be some associated processes that outline ordering constraints between the capabilities using a business process language, such as, for example, Business Process Model and Notation ("BPMN").

The generation, creation, or modification of a software implementation that both meets the client needs and leverages pre-defined offerings and process models as much as possible may include the development of final requirements through a combination of bottom-up elicitation of requirements from stakeholders, and top-down adoption of requirements derived from the reference or process model. A requirement may be, represent, or describe one or more functions, features, methods, acts, or processes that an enterprise or other client may desire or require in the software implementation. The process of mapping requirements to process models may begin, for example, by receiving or otherwise identifying a list of textual requirements from an enterprise seeking a tailored software implementation. The received or identified list of textual requirements may then be mapped to a process model for that industry.

A matching system for mapping textual requirements may be efficient and beneficial for maximizing precision and accuracy while accounting for and limiting or eliminating issues related to scale, linguistic complexity, implicit details, or high-frequency terms. For example, a matching system may be able to effectively match or map hundreds of requirements to a process model containing hundreds—or even thousands—of elements. Additionally or alternatively, a matching system may be able to account for domain-specific terms such as debit memo to refer to something that may be referred to by a term like invoice in the process model. Additionally or alternatively, a matching system may recognize implicit mapping, such as where a user talks about "entering a discount code" and is implying the capability of "creating a purchase order" without actually mentioning it. Additionally or alternatively, a matching system may be recognized and accurately match terms or keywords that may appear many times in a process model in various contexts. For example, the object "invoice" may appear in many capabilities in a process models, and a matching system may match a keyword, such as by or through an analysis of a verb, object, and prepositional phrase which make a capability unique.

Some examples of mapping some requirements to capabilities with the system are shown below in Table I. These examples illustrate the complexity of the matching textual requirements to capabilities, and the system's automated mapping capabilities that can handle such complexities.

TABLE I

| Capability | Mapped Requirement |
| --- | --- |
| C1: Create sales order | R1: Sales order shall be created by a user. |
| C2: Create invoice | R2: The system shall allow the user to create a debit memo. |
| C3: Create delivery document | R3: The system shall allow the user to select transportation mode. |
| C4: Create Purchase Order with Reference to a Contract | R4: The system shall allow the user to create contracts and use them as reference for order creation. |

In the first example in Table I, the requirement R1 is mapped to the capability C1. The automated system can deal with multiple variations of saying the same thing. Systems which include heuristics, such as matching system 200 discussed below, may be capable of leveraging a dependency tree to deal with such issues.

In the second example in Table I, the requirement R2 is mapped to the capability C2. In order to map this requirement to the capability, in addition the dependency analysis described in a previous example, a system such as the mapping system 200 may understand or include domain knowledge that "Debit Memo" is a synonym of "invoice."

In the third example in Table I, the requirement R3 is mapped to the capability C3. Here, a system, such as matching system 200, may leverage domain knowledge that the verb "select" is one of the many possible actions in a "create object" action and "transportation mode" is an attribute that belongs to the object "delivery document." Leveraging this domain knowledge may prove beneficial to the system 200 in mapping the requirement to the capability.

In the fourth example in Table I, the requirement R4 is mapped to the capability C4. In this example, the requirement is poorly formed. The system may use an information retrieval (IR) technique to create the mapping for this requirement.

As described herein, the system may identify textual relationships between requirements statements and textual capabilities of a process model in an automated fashion, thereby efficiently mapping an enterprise's textual requirements to the process model.

Figure 2:
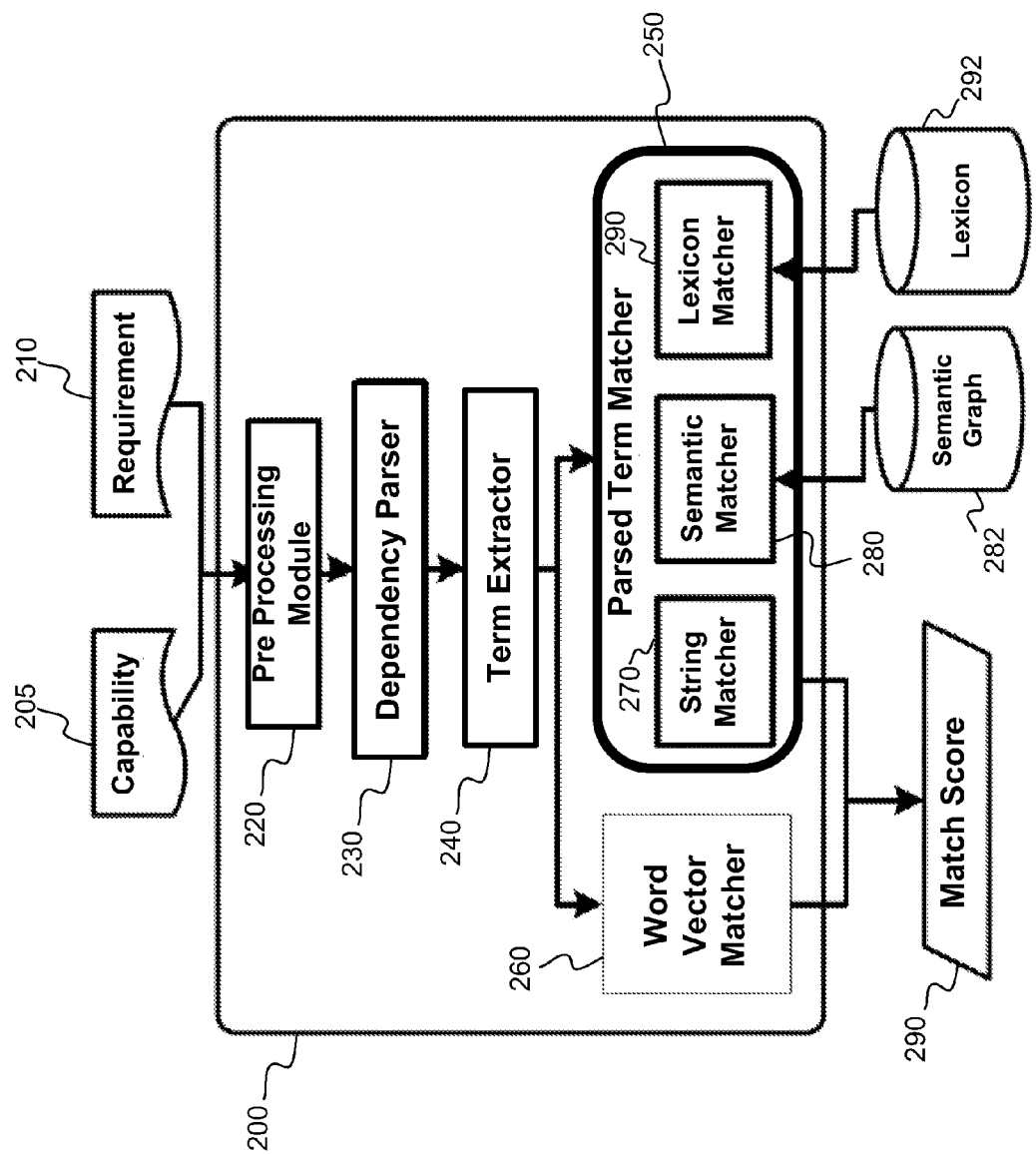
FIG. 2 shows an example of a matching system that may be used for identifying textual relationships.

FIG. 2 illustrates a matching system 200 for identifying textual relationships which may be used to identify textual relationships between a requirements statement and a process model. The matching system 200 may use a combination of natural language processing ("NLP"), IR techniques, and semantic reasoning to automatically match and map textual requirements to process models.

The matching system 200 may receive a capability statement 205. The capability statement may be or include a textual capability statement regarding a capability included in a processing model. For example, the capability statement may be "Create Invoice" capability 120 shown in FIG. 1. Alternatively, the capability statement may be any capability included in the processing model.

The matching system 200 may receive a requirement statement 210. The requirement statement may, for example, be a textual statement received by the matching system 200 from the enterprise. The requirement statement 210 may describe a capability that the enterprise may have or desire in the software implementation. In some systems, the enterprise may transmit or otherwise send to the matching system 200 hundreds or thousands of requirement statements 201. The received capability statement 205 and the requirement statement 210 may be or form a textual statement pair.

While the matching system 200 is shown as receiving a capability statement 205 and a requirement statement 210 for matching, in other systems or configurations, the matching system 200 may receive and be used to match or otherwise compare two textual statements which may not be capability statements or requirement statements.

The capability statement 205 and the requirement statement 210 may be sent, passed, or otherwise transmitted to a pre-processing module 220 of the matching system 200. The pre-processing module 220 may process one or more statements, such as the capability statement 205 or the requirement statement 210, so that the statement may be parsed by a dependency parser 230. For example, in one embodiment, the pre-processing module 220 may remove special characters, such as quotes, hyphens, periods, colons, or other characters, from the statements. Various other examples of pre-processing may be performed by the pre-processing module 220.

The capability statement 205 and the requirement statement 210 may be sent, passed, or otherwise transmitted to a dependency parser 230. In some systems, the output of the pre-processing module 220 is sent to the dependency parser 230. The dependency parser 230 may extract one or more parts or relations from each of the capability statement 205 and the requirement statement 210. The use of a dependency tree for extracting content from requirements may reduce a susceptibility to syntax of the sentence.

The dependency parser 230 may use a rule based approach to extract parts from the text of one or both of the capability statement 205 and the requirement statement 210. The dependency parser 230 may use a set of heuristics over a dependency tree to extract relevant parts, words, or terms. The dependency parser 230 may generate or otherwise acquire and utilize a dependency tree. The dependency tree may include one or more dependencies, relations, or relationships ("relations"). Some examples of dependencies considered, reported, or analyzed by the dependency parser 230 as shown below in Table II, and may include:

1) dobj may be created, used, and refer to a direct object of a verb of one of the statements, such as the capability statement 205 or the requirement statement 210. The dobj dependency relation may identify direct objects of verbs for active sentences. For example, for the statement "System shall allow the user to create an invoice," a dobj(create, invoice) relation may be generated, identifying that the direct object "invoice" of the verb "create" in the statement. Various other examples are possible.

2) nsubjpass may be created, used, and refer to the object of a passive clause. The nsubjpass dependency relation may identify objects of related to verbs for passive sentences. For example, for the statement "Credit Notes and Returns must be approved before they can be processed," a nsubjpass(approved, Notes) relation may be generated, identifying the object "Notes" of the verb "approved" in the statement. Various other examples are possible.

3) prep may be created, used, and refer to a prepositional modifier of a noun or a verb. The prep relation may identify preposition phrases linked to a verb phrase. For example, for the statement "The system shall allow the user to send a Purchase Order to the ERP system," a prepto(send, ERP) relation may be generated, identifying the verb "send" as being directed "to" the preposition phrase "ERP" in the statement. Various other examples are possible.

4) nn may be created, used, and refer to a noun compound modifier of a rightmost noun of a noun phrase. The nn relation may be used to identify the full name of the objects being extracted. For example, for the statement "Credit Notes and Returns must be approved before they can be processed," a nn(Notes, Credit) relation may be generated, identifying "Credit" as a compound modifier of a rightmost noun "Notes" in the statement. Various other examples are possible.

5) conj may be created, used, and refer to a conjunction relationship (and/or) between different constituents of a sentence. The conj relation may be used to create VOP triples from complex sentences that use conjunctions and disjunctions. For example, for the statement "The system shall allow the user to create and maintain an order," a conjand(create, maintain) relation may be generated, identifying an "and" relationship between the verbs "create" and "maintain." Various other examples are possible.

Relations, such as any of the dependencies, relationships, or relations described, may then be sent from the dependency parser 230 to the term extractor 240. The term extractor 240 may use a simple set of rules to extract parsed word groups, such as verb-object-preposition (VOP) triple, from the statements. For example, the term extractor 240 may identify verb and object relationships using dobj and nsubjpass relations, each of which may identify a verb and object. The term extractor 240 may then check the statement for one or more prepositional modifier or conjunction relations, such as by analyzing any prep or conj relations generated. The term extractor 240 may also or alternatively extract relevant relationships and objects are also extracted. The term extractor 240 may recursively extract the complete object names for any objects using the nn relation. Additional rules or relations may be created, generated, or used to handle more variations in some systems.

Table II, shown below, offers some examples of statements, a list of dependencies, and the parsed word groups identified for the statements. The second column shows the list of dependencies and relations generated using the dependency parser 230. Key dependencies that may be used for extracting VOP triples may be highlighted in bold. The third column shows parsed word groups, such as VOP triples, that have been extracted by the term extractor 240 using the list of dependencies or relations for the statements. Many other variations are possible.

TABLE II

| Statements | Dependency List | VOP |
| --- | --- | --- |
| System shall allow the user to create an invoice. | (allow, System), aux(allow, shall), det(user, the), dobj(allow, user), aux(create, to), infmod(user, create), det(invoice, an), dobj(create, invoice) | V = create, O = invoice; |
| The system shall allow the user to send a Purchase Order to the ERP system. | nsubj(allow, System), aux(allow, shall), det(user, the), dobj(allow, user), aux(send, to), infmod(user, send), det(Order, a), nn(Order, Purchase), dobj(send, Order), prepto(send, ERP.) | V = create, O = Purchase Order, P = ERP System; |
| Credit Notes and Returns must be approved before they can be processed. | nn(Notes, Credit), nsubjpass(approved, Notes), conjand(Notes, Returns), aux(approved, must), auxpass(approved, be), mark(processed., before), nsubj(processed., they), aux(processed., can), cop(processed., be), advcl(approved, processed.) | V = approved, O = Credit Notes; V = approved, O = Returns; |
| The system shall allow the user to create and maintain an order. | det(system, The), nsubj(allow, system), aux(allow, shall), det(user the), dobj(allow, user), aux(create, to), | V = create, O = Order; V = maintain, O = Order; |

TABLE II-continued

| Statements | Dependency List | VOP |
|---|---|---|
| | infmod(user, create), conjand(create, maintain), det(order, an), dobj(create, order) | |

The matching system 200 may process each of the capability statement 205 and the requirement statement 210 separately to generate parsed word groups using one or more of the pre-processing module 220, the dependency parser 230, or the term extractor 240. In some systems, the parsed word groups may all be VOP triples, such as in systems where a verb, object, and preposition are the only or the main parts that are typically found in a capability. In other systems, the parsed word groups may include different words, terms, or portions of statements. In some systems where VOP triples are extracted, one or more of the verb, object, and preposition may not be extracted, such as where the statement does not include one or more of the verb, object, and preposition. For example, in the statement "System shall allow the user to create an invoice," there is no preposition, and therefore the VOP triple may merely include "create" as the verb and "invoice" as the object. Other variations are possible.

Once the parsed word groups have been created, such as by or using one or more of the pre-processing module 220, the dependency parser 230, or the term extractor 240, these parsed word groups may be passed to the parsed term matcher 250. The parsed term matcher 250 may receive, such as from the term extractor 240, one or more of a parsed word group for the capability statement 205 and a parsed word group for the requirement statement 210.

The parsed term matcher 250 may compare or otherwise match the parsed word groups for the capability statement 205 and the requirement statement 210. The combination of a parsed word group for the capability statement 205 and a parsed word group for the requirement statement 210 may be referred to as a parsed word group pair. A parsed word group pair may, for example, be a combination or pair of parsed word groups, with one parsed word group being for a first textual statement such as a capability statement 205, and with the second parsed word group being a second textual statement, such as a requirement statement 210. In some systems, the parsed word groups from each of the first textual statement and the second textual statement may include similar or the same term types. For example, a parsed word group pair may include a VOP triple from the first textual statement and a VOP triple from the second textual statement. Matching using the parsed term matcher 250 may be referred to as parsed word matching, parsed word group matching, or NLP matching.

The parsed term matcher 250 may include, for example, one or more of a string matcher 270, a semantic matcher 280, and a lexicon matcher 290. Fewer or more matchers may be included in the parsed term matcher 250. The parsed term matcher 250 may utilize one or more of the string matcher 270, semantic matcher 280, and lexicon matcher 290, separately or together, to generate one or more similarity scores for the parsed word groups for the capability statement 205 and the requirement statement 210. A similarity score may be a rating, degree, score, or other value which may indicate a level of similarity between a first textual statement, such as a capability statement 205, and a second textual statement, such as a requirement statement 210.

In some systems, the matching of the parsed word groups performed by the parsed term matcher 250 may be separated into a matching for each part or term of a parsed word group. In these systems, term pairs may be identified or generated, such as from the parsed word groups or the parsed word group pairs. Term pairs may, for example, be a pair of terms, with one term from the first textual statement and a second term from the second textual statement. Each of the terms in a term pair may be terms with one or more characteristic in common, such as a term type. For example, a term pair may include a verb from a first textual statement and a verb from the second textual statement. A term may be one word or more than one word. For example, a phrase "customer invoice" may be a term. Other variations are possible.

As an example, a parsed term matcher 250 may match a verb from the VOP triple for the capability statement 205 to a verb from the VOP triple for the requirement statement. A similar analysis may be conducted for matching objects or prepositions of the VOP triples for the capability statement 205 and the requirement statement 210. The compared or matched terms may be denote $T_R$ and $T_C$, where $T_R$ may be a term, such as a verb, object, or preposition, for the requirement statement 210, and $T_C$ may be the same type of term, such as a verb, object, or preposition, for the capability statement 205.

In some systems, the terms $T_R$ and $T_C$ that are used during a comparison or matching analysis may be base words or stemmed versions for the terms from the requirement statement 210 and the capability statement 205 respectively. For example, where a verb for a requirement statement 210 is "generating," the term $T_R$ used for comparison or matching may be "generat." As another example, where a verb for the capability statement 205 is "generates," the term $T_C$ used for comparison or matching may also be "generat." Various methods and examples of obtaining the base words or stemmed versions of the terms are possible. In other systems, the exact terms and their prefixes or suffixes may be used for the terms $T_R$ and $T_C$. Various other examples are possible.

The parsed word matcher 250 may use or include a string matcher 270 which may match or otherwise identify a relationship between one or more terms of the parsed word group. The string matcher 270 may generate a string similarity score ($SIM_{str}(T_R, T_C)$), which may indicate a string similarity score between the two terms $T_R$ and $T_C$ of the same type. The string similarity score $SIM_{str}(T_R, T_C)$ may be based on an exact string comparison of the two terms $T_R$ and $T_C$.

The string similarity score $SIM_{str}(T_R, T_C)$ may, in some instances, indicate one of only two possible outcomes—either the two terms $T_R$ and $T_C$ exactly match, or they do not. For example, the string similarity score $SIM_{str}(T_R, T_C)$ may return a value of "1" where the terms $T_R$ and $T_C$ are an exact match, and may return a "0" where they do not exactly match. As a specific example, the string matcher 270 may generate a string similarity score $SIM_{str}(T_R, T_C)=1$ where the term $T_R$ is "generat" and where the term $T_C$ is also "generat." In some systems, the string similarity score may not be less than zero and may not be greater than 1. Various other examples are possible.

The parsed word matcher 250 may use or include a semantic matcher 280 which may match or otherwise identify a relationship between one or more terms $T_R$ and $T_C$ of the parsed word group. The semantic matcher 280 may generate a semantic similarity score ($SIM_{sem}(T_R, T_C)$) which may indicate a semantic similarity score between any two terms $T_R$ and $T_C$. The semantic similarity score may measure, indicate, or otherwise represent a level or degree of similarity of terms in a first textual statement and a second textual statement, and may account for variations in words, synonyms, and other semantic relationships between terms. The semantic similarity score $SIM_{sem}(T_R, T_C)$ may be based on semantic relationship between the words.

The semantic matcher 280 may access, use, consult, receive information, transmit information, or otherwise communicate with a semantic graph 282 before, during, or after calculating a semantic similarity score. The semantic graph 282 may contain information, data, models, flowcharts, dependency or hierarchical trees or charts, or various other information for one or more words or capabilities. The information in the semantic graph 282 may be used by the semantic matcher 280 to determine the semantic similarity score $SIM_{sem}(T_R, T_C)$, such as by analyzing each of the terms $T_R$ and $T_C$ to identify a relationship between the terms $T_R$ and $T_C$.

With or without the aid of a semantic graph 282, the semantic matcher 280 may determine, calculate, or otherwise generate the semantic similarity score $SIM_{sem}(T_R, T_C)$. An example of a formula that may be used for determining a semantic similarity score $SIM_{sem}(T_R, T_C)$ is:

$$SIM_{sem}(T_R, T_C) \begin{cases} 1 & \text{if } sameAs(T_R, T_C) \\ \alpha_1 & \text{if } subClassOf(T_R, T_C) \\ \beta_1 & \text{if } partOf(T_R, T_C) \\ \alpha_2 & \text{if } subClassOf(T_C, T_R) \\ \beta_2 & \text{if } partOf(T_C, T_R) \\ 0 & \text{otherwise} \end{cases}$$

In the above formula for calculating a semantic similarity score, $sameAs(T_R, T_C)$ may be a function that returns true if two elements in the semantic graph 282 are equivalent or otherwise have the same meaning. As an example, the $sameAs(T_R, T_C)$ may be or return a value of "1" where the term $T_R$ is "generat" and where the term $T_C$ is also "generat." As another example, the $sameAs(T_R, T_C)$ may be or return a value of "1" where the term $T_R$ is "bill" and where the term $T_C$ is "invoice," and where the semantic graph 282 indicates that "bill" and "invoice" are synonyms or have the same meaning within the processing model. However, the $sameAs(T_R, T_C)$ may be or return a value of "0" (or an indication of false) where the term $T_R$ is "create" and where the term $T_C$ is "delete," where the semantic graph 282 does not indicate that "create" and "delete" have the same meaning. Many other examples are possible.

In the above formula for calculating a semantic similarity score, $subClassOf(T_R, T_C)$ may be a function that returns true if $T_R$ is a sub-class of $T_C$ in the semantic graph 282. The semantic graph 282 may include dependency, hierarchical or class based information or data for one or more terms. As an example, $subClassOf(T_R, T_C)$ may be or return a value of $\alpha_1$ where the term $T_R$ is "sales order" and where the term $T_C$ is "order," and where the semantic graph 282 indicates that "sales order" is a sub-class of "order." As another example, where $T_R$ is "order" and where the term $T_C$ is "sales order," the $subClassOf(T_R, T_C)$ may be or return a value of 0, as "order" may not be a sub-class of "sales order." Various other examples are possible.

In the above formula, $subClassOf(T_C, T_R)$ may be a function that returns true if $T_C$ is a sub-class of $T_R$ in the semantic graph 282. The determination may be the same or similar to the determination for $subClassOf(T_R, T_C)$, except that the terms may be considered in a reverse order. As an example, where $T_R$ is "order" and where the term $T_C$ is "sales order," the $subClassOf(T_C, T_R)$ may be or return a value of $\alpha_2$ where the semantic graph 282 indicates that "sales order" is a sub-class of "order." In this example, $subClassOf(T_R, T_C)$ would be or return a value of "0" or "false." Various other examples are possible.

In the above formula for calculating a semantic similarity score, $partOf(T_R, T_C)$ may be a function that returns true if $T_R$ is a part-of $T_C$ in the semantic graph 282. As an example where the term $T_R$ is "transportation mode" and where the term $T_C$ is "delivery document," and where the semantic graph 282 indicates that "transportation mode" is a part of "delivery document," the $partOf(T_R, T_C)$ may be or return a value of $\beta_1$. Various other examples are possible.

In the above formula, $partOf(T_C, T_R)$ may be a function that returns true if $T_C$ is a part-of $T_R$ in the semantic graph 282. The determination may be the same or similar to the determination for $partOf(T_R, T_C)$, except that the terms may be considered in a reverse order. As an example, where $T_R$ is "delivery document" and where the term $T_C$ is "transportation mode," the $partOf(T_C, T_R)$ may be or return a value of $\beta_2$ where the where the semantic graph 282 indicates that "transportation mode" is a part of "delivery document." Various other examples are possible.

The above formula for calculating a semantic similarity score may also return a value of "0" if none of the $sameAs(T_R, T_C)$, $subClassOf(T_R, T_C)$, $partOf(T_R, T_C)$, $subClassOf(T_C, T_R)$, and $partOf(T_C, T_R)$ return true or non-zero values. In some systems, the semantic similarity score may not be less than zero and may not be greater than 1.

The semantic similarity score may include or utilize different or additional considerations, relationships, hierarchies, or information to calculate the semantic similarity score. In some systems, fewer relationships may be considered.

Various research and methods may be employed to determine or set values for $\alpha_1$, $\beta_1$, $\alpha_2$, and $\beta_2$. For example, one or more tests or analyses of data may be used to determine various semantic similarity scores for comparisons of one or more capability statements 205 or requirement statements 210, with various values for $\alpha_1$, $\beta_1$, $\alpha_2$, and $\beta_2$ chosen for each comparison. Analyzing the results of these tests may indicate that one or more values for $\alpha_1$, $\beta_1$, $\alpha_2$, and $\beta_2$ may provide the best, most accurate, or most precise results. Various other methods of deriving or setting the values for $\alpha_1$, $\beta_1$, $\alpha_2$, and $\beta_2$ are possible.

Various values may be determined or set for $\alpha_1$, $\beta_1$, $\alpha_2$, and $\beta_2$. As one example determined empirically, the values for the constants may be set as follows: $\alpha_1=0.95$, $\beta_1=0.85$, $\alpha_2=0.85$, $\beta_2=0.75$. This set of values may be designed to penalize requirements that are more general than capabilities and reward requirements that are more specific that capabilities. Various other examples are possible.

The semantic graph 282 used or referred to by the semantic matcher 280 may be customizable or generated in a variety of ways. As users may often refer to different common attributes of objects such as invoice and purchase order, the semantic graph 282 may model or otherwise incorporate relationships between commonly used terms in the domain of the process model using one or more different techniques.

For example, the semantic graph 282 may extract frequently used words. A word histogram for the verbs and the nouns may be created from or using tagged words. For example, the frequencies of the most common verbs and nouns in an example Order to Cash process model are shown below in Table III. One or more of the most frequently occurring nouns or verbs may be added as nodes to the semantic graph 282.

TABLE III

| Verb | Frequency | Noun | Frequency |
|---|---|---|---|
| Maintain | 638 | Data | 155 |
| Create | 618 | Order | 127 |
| Define | 328 | Planning | 122 |
| Process | 250 | Contract | 118 |
| Manage | 200 | Sales | 107 |
| Perform | 144 | Invoice | 95 |
| Execute | 90 | Customer | 89 |
| View | 60 | Payment | 67 |
| Assign | 58 | Project | 66 |
| Set | 56 | shipment | 54 |

As another example of a technique used in creating the semantic graph 282, frequently used phrases may be extracted. Extraction of one or more phrases may be accomplished in a variety of ways and using different techniques. For example, a search may be conducted for two-grams and three-grams that contains the most frequent nouns in the index. Then these most frequent words may filtered using a high pass filter with a lower cutoff. As another example, a n-gram index may be created and used to filter the most frequent n-grams. In some systems, phrases extracted (for e.g. debit memo and customer invoice) using one or both of the above techniques may be populated into the semantic graph 282.

As another example of a technique used in creating the semantic graph 282, relationships between nodes may be added to the semantic graph 282. As noted above, the semantic graph 282 may have, define, identify, or otherwise include at least the following three types of relationships: 1) subClass 2) partOf 3) sameAs. The subClass relationship may be semi-automatically created, such as where users may be presented a set of candidates for subclasses using a heuristic. For example, a word W which may be a suffix of phrase P (e.g. order—sales order) may indicate that P is a subclass of W. For each concept, synonyms from the lexicon 292 may be shown to users who may then select the relevant ones to be added using the sameAs relationship. Adding partOf relations may be performed mostly manually, or partially automatically. Using these and other techniques, the semantic graph 282 may be created or populated for use with the semantic matcher 280.

Figure 3:
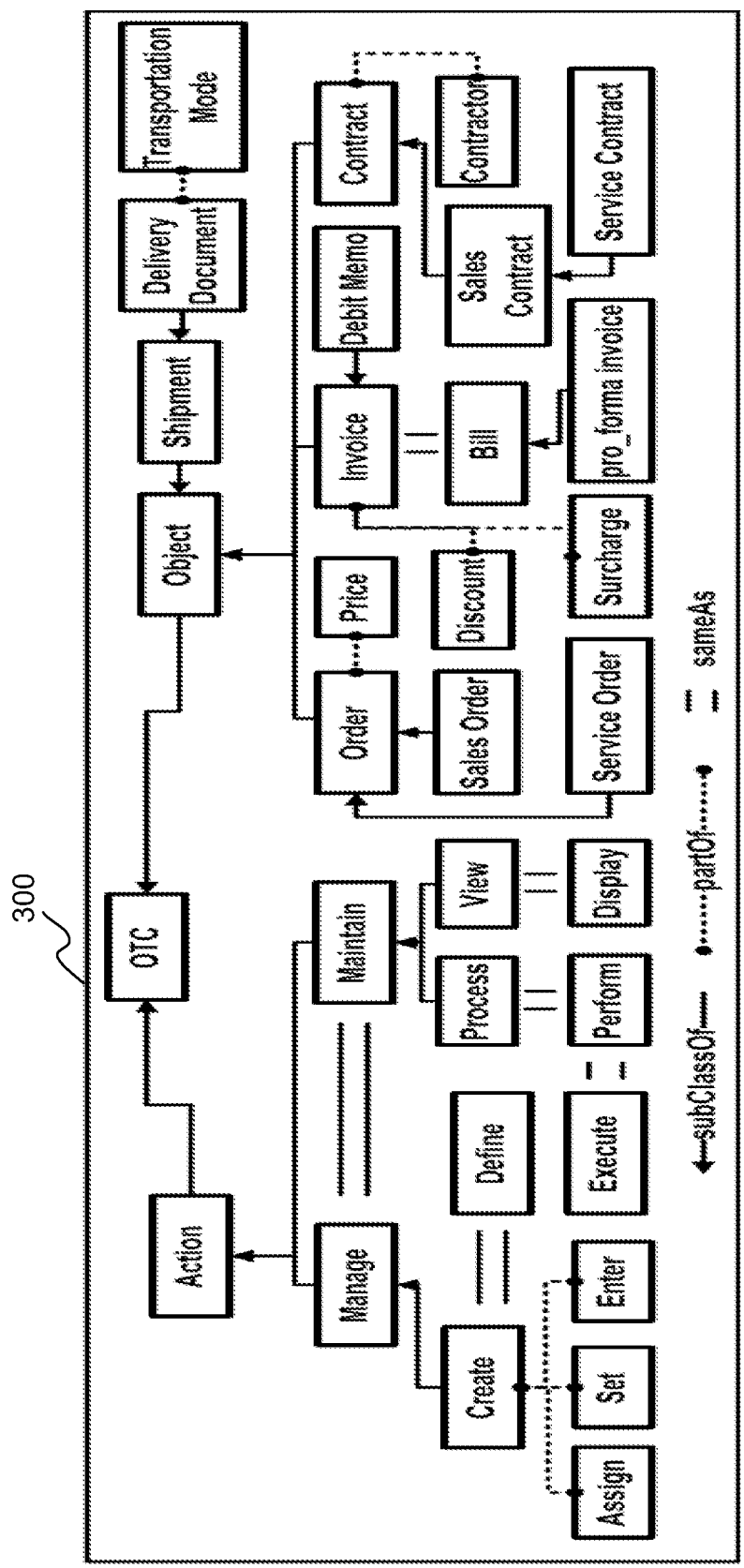
FIG. 3 shows an example of a semantic graph that may be used with a matching system.

FIG. 3 shows an example semantic graph 300 which may be similar to, the same as, or otherwise resemble the semantic graph 282. The semantic graph 300 shows relations between one or more capabilities or terms, such as sameAs, partOf and subClass relations. Other semantic graphs 282 may be created or used, such as a semantic graph 282 specific to or specially designed or created for one or more process models or industries. Various other semantic graphs 282 are possible.

In addition or alternatively, the parsed word matcher 250 may use or include a lexicon matcher 290 which may match or otherwise identify a relationship between one or more terms of the parsed word group. The lexicon matcher 290 may generate a lexicon similarity score ($SIM_{Lex}(T_R, T_C)$), which may indicate a lexicon similarity between the two terms $T_R$ and $T_C$ of the same type. The lexicon similarity score $SIM_{Lex}(T_R, T_C)$ may be used to identify a similarity between two terms $T_R$ and $T_C$ based on their relative positions in a word taxonomy.

The lexicon matcher 290 may access, use, consult, receive information, transmit information, or otherwise communicate with a lexicon 292 before, during, or after calculating a lexicon similarity score. The lexicon 292 may be or include one or more of information, data, a taxonomy of words, a thesaurus, and a dictionary. The lexicon 292 may include one or more tables or lists of antonyms, synonyms, homonyms, or other terms or words. In some systems, a tool such as WordNet may be used as a lexicon 292. The information in the lexicon 292 may be used by the lexicon matcher 290 to determine the lexicon similarity score $SIM_{Lex}(T_R, T_C)$, such as by analyzing each of the terms $T_R$ and $T_C$ to identify a taxonomy between or with the terms $T_R$ and $T_C$.

With or without the aid of a lexicon 292, the lexicon matcher 290 may determine, calculate, or otherwise generate the semantic similarity score $SIM_{Lex}(T_R, T_C)$. An example of a formula that may be used for determining a lexicon similarity score $SIM_{Lex}(T_R, T_C)$ is:

$$SIM_{Lex}(T_R, T_C) = \frac{2IC(lcs(T_R, T_C))}{IC(T_R) + IC(T_C)}$$

In the above formula for calculating a lexicon similarity score, the information content of a term t, denoted IC(t), may be calculated using a formula:

$$IC(t) = -\ln\left(\frac{freq(t)}{freq(\text{root})}\right).$$

In this formula, freq(t) and freq(root) may be the frequencies of the term t and the root r of the taxonomy, respectively. The lowest common subsumer (lcs) of two terms $T_R$ and $T_C$ may be the lowest node in the taxonomy that subsumes both the terms. In some systems, the lexicon similarity score may not be less than zero and may not be greater than 1. Various other example of a lexicon similarity score may be implemented or used with the lexicon matcher 290 or the parsed term matcher 250.

One or more of the string matcher 270, the semantic matcher 280, and the lexicon matcher 290 may each be used to calculate a term pair similarity score for each term pairs $(T_R, T_C)$ from the parsed word groups for the capability statement 205 and requirement statement 210. For example, in some systems, the string matcher 270, the semantic matcher 280, and the lexicon matcher 290 may be each be used to calculate term pair similarity scores for verb pairs $(V_R, V_C)$, object pairs $(O_R, O_C)$, and prepositional pairs $(P_R, P_C)$ for a capability statement 205 and a requirement statement 210.

For each term pair $(T_R, T_C)$ compared or otherwise matched from a parsed word group for the capability statement 205 and parsed word group for the requirement statement 210, the parsed term matcher 250 may generate a term pair similarity score $SIM(T_R, T_C)$. The term pair similarity score $SIM(T_R, T_C)$ may leverage or consider one or more of the string similarity score $SIM_{str}(T_R, T_C)$, the semantic similarity score $SIM_{sem}(T_R, T_C)$, and the lexicon similarity score $SIM_{Lex}(T_R, T_C)$. For example, the parsed term matcher 250 may compare the scores from the string matcher 270, the semantic matcher 280, and the lexicon matcher 290, and may determine or designate that the term pair similarity score $SIM(T_R, T_C)$ be the maximum of these scores, as shown in the formula below:

$$SIM(T_R, T_C) = \max \begin{Bmatrix} SIM_{str}(T_R, T_C), \\ SIM_{sem}(T_R, T_C), \\ SIM_{Lex}(T_R, T_C) \end{Bmatrix}$$

The term pair similarity score for each term pair may be calculated individually. For example, the $SIM(V_R, V_C)$ as calculated using the above formula may be equivalent to $SIM_{str}(V_R, V_C)$, while the $SIM(O_R, O_C)$ may be equivalent to $SIM_{sem}(O_R, O_C)$. Various other examples or combinations are possible.

In some systems, the parsed term matcher 250 may utilize an additional or alternative comparison or matching formula or algorithm for matching of prepositional pairs $(P_R, P_C)$. For example, the parsed term matcher 250 may determine or otherwise calculate a prepositional similarity score $SIM_P(P_R, P_C)$ separately from a similarity score for a verb pair or an object pair, such as using the following formula:

$$SIM_P(P_R, P_C) = \begin{cases} 1 & \text{if } P_R = \text{null} \\ \gamma & \text{if } P_C = \text{null} \\ SIM(P_R, P_C) & \text{otherwise} \end{cases}$$

The above formula may add an extra or alternative layer, determination, or calculation to determining a similarity score for a prepositional pair $(P_R, P_C)$, which may be useful where one of the capability statement 205 or requirement statement 210 has a prepositional term $P_R$ or $P_C$ while the other does not. For example, in this formula, the prepositional similarity score $SIM_P(P_R, P_C)$ may be or return a value of "1" or "true" where the requirements statement 210 includes a term $P_R$ and the capability statement 205 does not include a prepositional term. Where, alternatively, the capability statement 205 includes a term $P_C$ and the requirement statement 210 does not include a prepositional term, the prepositional similarity score $SIM_P(P_R, P_C)$ may be or return a value of "γ". The value for γ may be set empirically and may be various values. For example, in some systems, γ=0.8. Under either of these circumstances, the statement with the prepositional term may be treated as being more specific than the statement without a prepositional term. For example, a requirement statement 210 which includes "create contract for e-commerce" may be considered to be more specific than a capability statement "create contract." Where both of the capability statement 205 and requirement statement 210 have a prepositional term (or where neither has a prepositional term), the formula may revert back to the $SIM(P_R, P_C)$ score calculated by the parsed term matcher 250, such as using the maximum of one or more of a string similarity score, a semantic similarity score, and a lexicon similarity score.

Though not required, one reason the above formula may be useful for determining a prepositional similarity score $SIM_P(P_R, P_C)$ may be that verb and object based matches may be more important than a prepositional match. As such, the similarity measures may be designed to penalize differences between verbs or objects more than for prepositions. In other systems, the similarity score for the prepositional pairs may not include this additional formula.

The determined similarity scores for each of the term pairs, which may be referred to as term pair similarity scores or term pair sub-scores, may be used by the parsed term matcher 250 to determine a parsed word similarity score for the parsed word group for the capability requirement 205 and the parsed word group for the requirement statement 210. A parsed word similarity score may indicate, represent, quantify, or otherwise identify a degree or level of similarity or matching of the parsed words from a first textual statement and the parsed words from a second textual statement. For example, the parsed term matcher 250 may calculate a parsed word similarity score (also referred to as a parsed word score) as a product of each of the term pair sub-scores. For example, an overall parsed word similarity score (VOP(R, C)) between a requirement(R) and a capability(C) may be calculated as a product of the similarity score for the verb pair $(SIM(V_R, V_C))$, the similarity score for the object pair $(SIM(O_R, O_C))$, and the similarity score for the prepositional pair $(SIM_P(P_R, P_C))$, as shown below:

$$VOP(R, C) = \max_{\substack{\langle V_R, O_R, P_R \rangle \in R, \\ \langle V_C, O_C, P_C \rangle \in C}} \begin{Bmatrix} SIM(V_R, V_C) \times \\ SIM(O_R, O_C) \times \\ SIM_P(P_r, P_C) \end{Bmatrix}$$

In this formula, $\langle V_R, O_R, P_R \rangle$ may be a VOP triple extracted from requirement statement 210 and $\langle V_C, O_C, P_C \rangle$ may be a VOP triple extracted from capability statement 205.

In some systems, the parsed word similarity score may be calculated as a product of all of the term pairs in parsed word groups for the capability statement 205 and the requirement statement 210. In other systems, one or more term pairs from a parsed word group may be ignored in calculating a parsed word similarity score. In some systems, the parsed word similarity score may not be less than zero and may not be greater than 1. Other variations are possible.

One or more parts of the matching system 200, such as the pre-processing module 220, the dependency parser 230, and the term extractor 240, may additionally or alternatively be used to create word vectors for each of the capability statement 205 and the requirement statement 210. For example, the term extractor 240 may be used to create a word vector for a statement. Word vectors may, for example, be a vector or stream of some or all words or terms in a textual statement. The words or terms in a word vector may be weighted, such as based on various characteristics or a frequency of the words or terms. The word vectors may model a capability statement 205 or a requirements statement 210 as a bag or collection of words. An order of the words or terms in a textual statement may not be important or identified in a word vector. A word vector may not depend on a structure of a statement from which the word vector was generated. Comparing word vectors may be beneficial and offer an additionally useful tool, especially where capability statements 205 or requirements statements 210 are poorly formed or complex, or where it may be hard to generate parsed word groups such as VOP triples.

In creating a word vector, such as a word vector for a capability statement 205 or a word vector for a requirements statement 210, the one or more parts of the matching system 200 may first extract terms or tokens from the parsed word groups of a statement where the matching system 200 was able to successfully parse the statement. The one or more parts of the matching system 200 may also search the text for objects which may defined in a semantic graph. The one or more parts of the matching system 200 may also tokenize the rest of the text and create a term vector for the statement. As an example, a word vector ("this", "is", "a", "fox") may be created for the sentence "This is a fox." Other variations and examples are possible.

A textual statement, such as a requirement statement word vector $\vec{R}$ or a capability statement word vector $\vec{C}$, may be created and weighted in various ways. For example, a word vector $\vec{R}$ or $\vec{C} = \{f_1 t_1, f_2 t_2, \ldots, f_n t_n\}$; where, $f_i$, is the weighted frequency of term $t_i$ in the term vector $\vec{R}$ or $\vec{C}$. The weighted frequency $f_i$ of each term $t_i$ may be determined or calculated in various ways, such as, for example, in the formula below:

$$f_i = \begin{cases} 0 & \text{if } t_i \in \{StopWords\} \\ \vec{f}_i + 1 & \text{if } t_i \in \{\langle V, O, P \rangle\} \\ \vec{f}_i + 1 & \text{if } t_i \in SemanticGraph \\ \vec{f}_i & \text{otherwise} \end{cases}$$

In the above formula, $\vec{f}_i$ may be the frequency of word $W_i$ in statement. The weighted nature of the word vectors, as shown in the above formula, gives an additional weight to verbs, objects, and prepositions in a statement, as these are often the terms in a statement that demonstrate a capability of a statement. Additionally, the weighted nature of the word vectors according to the above formula may also give additional weight to words which may appear in a semantic graph, such as the semantic graph 282. In some systems, all other words, except for stop words, may then be weighted equivalently. Various other weights are possible.

A word vector matcher 260 may compare or match the word vectors of the capability statement 205 and the requirement statement 210. For example, a requirement statement word vector $\vec{R}$ and a capability statement word vector $\vec{C}$ may be compared or matched by a word vector matcher 260 in various ways, such as by taking a dot product of the two word vectors $\vec{R}$ and $\vec{C}$. The result of the dot product of the two word vectors may be considered a word vector similarity score (also referred to as a word vector score). The word vector similarity score may, for example, represent a level or degree of similarity between the words or terms in a first textual statement and a second textual statement, irrespective of the placement or order of the words or terms in the statement. In some systems, the word vector similarity score may not be less than zero and may not be greater than 1. Word matching using the word vector matcher 260 may, in some systems, be referred to as vector matching, word vector matching, IR matching, cosine similarity matching, or various other matching or comparison.

In some circumstances, the comparison or matching of the two word vectors $\vec{R}$ and $\vec{C}$ may be considered or otherwise referred to as a weighted cosine. The weighted cosine or word vector similarity score between a requirement R and capability C may be described as:

$$\cos(R,C) = \vec{R} \cdot \vec{C}$$

The matching system 200 may determine an overall match score 290 (M(R, C)) between a capability statement 205 and a requirements statement 210 in a variety of ways. For example, the matching system 200 may calculate the overall match score M(R, C) 290 using one or more of the parsed word similarity score and the word vector similarity score. As an example, the matching system 200 may calculate the overall match score 290 as the maximum score from parsed word similarity score and the word vector similarity score, as shown below:

$$M(R,C) = \max\{\cos(R,C), VOP(R,C)\}$$

In this way, a similarity between capability statements 205 and requirement statements 210 may be reliably calculated, whether or not one or both of the statements 205 and 210 have been well or poorly constructed or whether or not these statements can be easily parsed. In this example, the greater the overall match score, the more likely it is that the requirement statement 210 and the capability statement 205 may match or otherwise be related.

Table IV as shown below depicts a set of mappings between example capability statements 205 (first column) and example requirement statements 210 (second column). An overall match score 290 for the capability statement 205 and the requirement statement 210 is shown in the third column, with details of the mapping, such as similarity scores for one or more term pairs, shown in the forth column.

TABLE IV

| Capability (C) | Mapped Requirement (R) | Match Score | Details | Link Type |
|---|---|---|---|---|
| Create sales order | Sales order shall be created by a user. | 1.0000 | V: $SIM_{str}$(created, create) = 1; O: $SIM_{str}$(sales order, sales order) = 1 | C = R |
| Create invoice | The system shall allow the user to create a debit memo. | 0.8500 | V: $SIM_{str}$(created, create) = 1; O: $SIM_{sem}$(debit memo, invoice) = 0.8 ∵ hasSubClass(invoice, debit memo) = T | C ⊒ R |
| Create delivery document | The system shall allow the user to select transportation mode. | 0.7225 | V: SIMsem (select, create) = 0.85 ∵ partOf (select, create) = T; O: $SIM_{sem}$(transportation mode, delivery document) = 0.85 ∵ part of (transportation mode, delivery document) = T | C ⊆ R |
| Create Purchase Order with Reference to a Contract | The system shall allow the user to create contracts and use them as reference for order creation | 0.8366 | $\vec{C}$ {purchas = 2, order = 2, refere = 2, creat = 2, contract = 2}; $\vec{R}$ {creation = 1, order = 2, refer = 1, creat = 2, contract = 2} | C ∩ R |
| the system allow the user to create contract | the system shall allow the user to cancel the contract | 0.0000 0.0000 | V: SIM(create, cancel) = 0; O: $SIM_{str}$ (contract, contract) = 1 $\vec{C}$ {creat = 2, contract = 2}; $\vec{R}$ {cancel = 2, contract = 2} | ≠ |

TABLE IV-continued

| Capability (C) | Mapped Requirement (R) | Match Score | Details | Link Type |
|---|---|---|---|---|
| The system shall allow the user to create Purchase Order for ERP | the system shall allow the user to create Purchase Order for SRM | 0.5000<br><br>0.0000 | $\vec{C}$ {purchas = 2, order = 2, creat = 2, erp = 2}; $\vec{R}$ {srm = 2, purchas = 2, order = 2, execut = 2}<br>V: $SIM_{str}$ (create, create) = 1; O: $SIM_{str}$ (Purchase Order, Purchase Order) = 1; P: SIM(ERP, SRM) = 0 | ≠<br><br>≠ |

In addition to generating a match scope, the matching system 200 may also or alternatively assign a link type to each mapping. The matching system 200 may use link types such as equivalent (=); subsumedBy (⊆), relatedTo (∩) and noMatch (≠). Note that when a mapping is generated using parsed word group matching, the matching system 200 may generate more fine-grained relationships such as equivalent and subsumedBy, but if the mapping is generated using word vector matching, then in some systems, only the relatedTo may be generated.

The matching system 200 may provide many benefits and may support many key analysis objectives, such as:
1) Highlighting common capabilities from a process model not specified in requirements.
2) Determining which portions of a process model correspond to requirements to identify relevant modules.
3) Identifying which of the enterprise's requirements do not map to elements of the process model and classifying them as non-standard (potentially risky and costly) requirements.
4) Making any asset or knowledge associated with that element available to support other analysis and design activities. For example, the mapping can be used to generate estimates based on previous projects or leverage reusable lessons-learned assets indexed with model elements.

Figure 4:
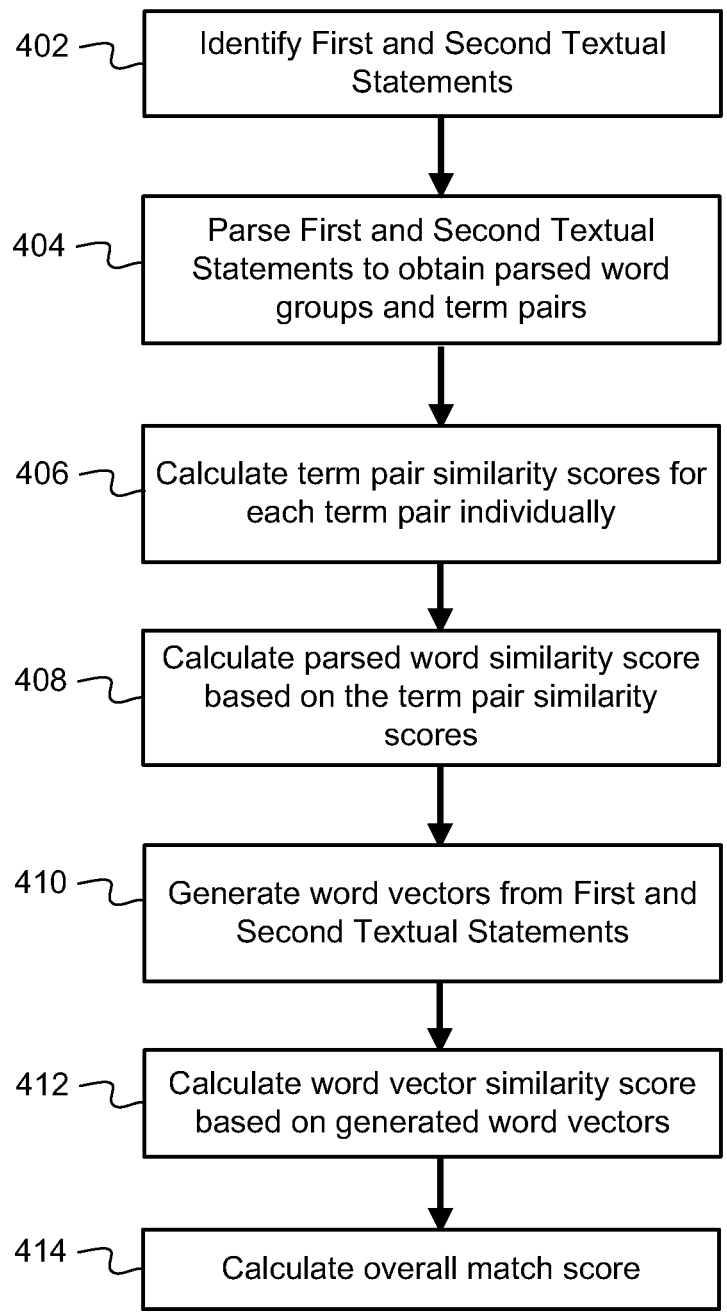
FIG. 4 shows an example of a method that may be used for identifying textual relationships.
Figure 5:
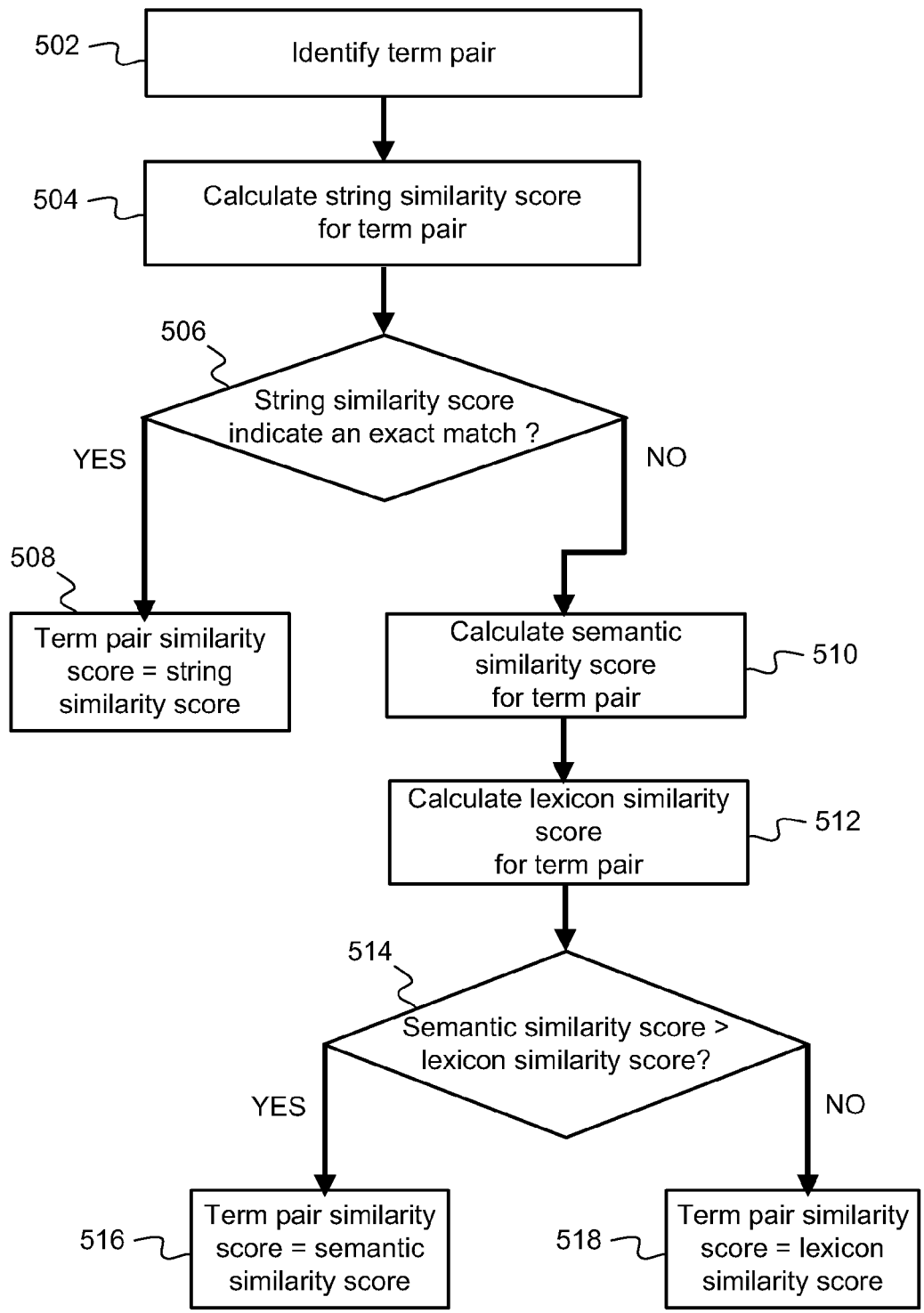
FIG. 5 shows an example of a method that may be used for identifying textual relationships.
Figure 6:
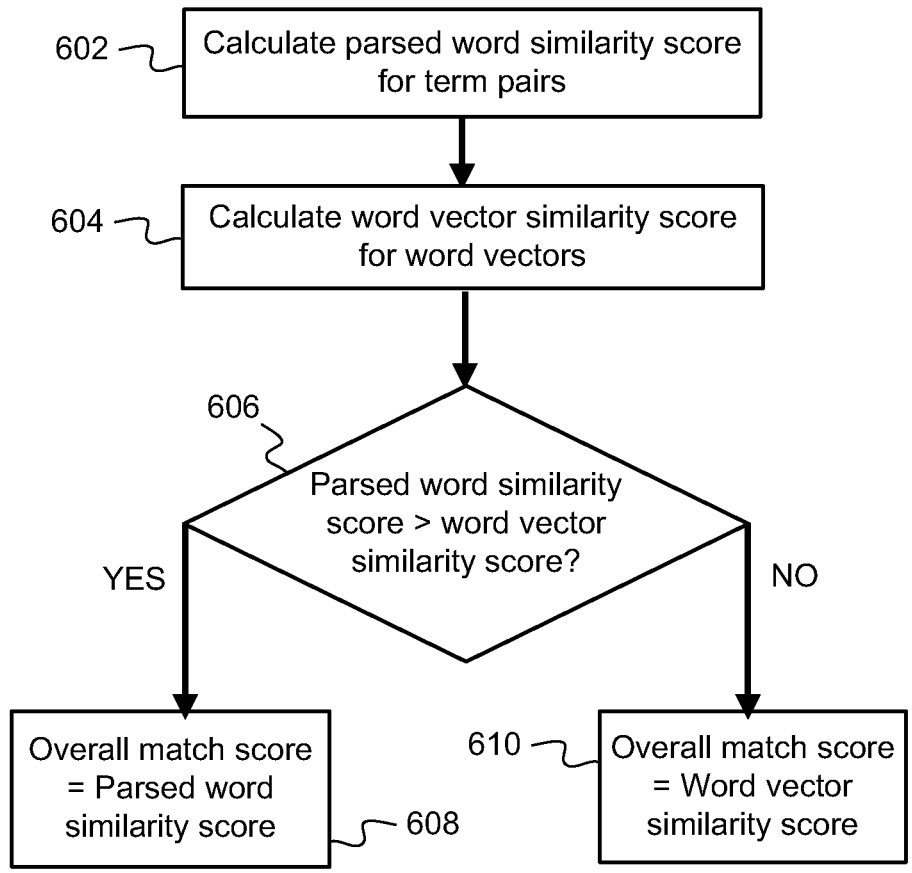
FIG. 6 shows an example of a method that may be used for identifying textual relationships.

FIGS. 4-6 depict various methods for identifying relationships between textual statements. The methods of FIGS. 4-6 may, for example, be partially or entirely implemented or performed by the matching system 200, components or modules in the matching system 200, or various other systems.

FIG. 4 illustrates a method for identifying a relationship between a first textual statement and a second textual statement. The method begins at block 402, where a first textual statement and a second textual statement are identified. In some systems, the first textual statement may be a requirement statement, such as requirement statement 210 received from an enterprise. In some systems, the second textual statement may be a capability statement or other process model description, such as capability statement 205 from the process model. The designation of first and second textual statements may be reversed, such that the first textual statement may be the capability statement, or vice versa. However, the method of FIG. 4 may also be used to compare various other textual statements which may not be requirement statements or capability statements. For example, the method of FIG. 4 may be used to compare translations of various statements, or in various other capacities.

Once the first and second textual statements have been identified, the method may proceed to block 404, where the first and second textual statements are parsed to obtain parsed word groups and term pairs. For example, the first textual statement may be parsed, such as by or using one or more of the Pre-processing module 220, the dependency parser 230, and the term extractor 240 as described, to obtain a first textual statement parsed word group. The same or a similar process may be performed on the second textual statement to obtain a second textual statement parsed word group. In some systems, the parsed word groups may be or contain VOP triples. In other systems, various other terms may be included in the parsed word groups.

Also in block 404, term pairs may be generated or otherwise identified for the first textual statement parsed word group and the second textual statement parsed word group. A term pair may have a term from the first textual statement and a term from the second textual statement. The term pairs may, for example, be or include like term types from the first textual statement parsed word group and the second textual statement parsed word group. For example, where the word groups are VOP triples, the term pairs may be verb pairs, object pairs, and prepositional pairs, as described. Other examples are possible.

In block 406, term pair similarity scores are calculated for each term pair individually. Calculation of the term pair similarity scores may be performed, for example, by one or more of a parsed term matcher 250, a string matcher 270, a semantic matcher 280, and a lexicon matcher 290.

In some methods, the term pair similarity score may be calculated by first calculating a string similarity score, a semantic similarity score, and a lexicon similarity score, as described above. These scores may, for example, be calculated individually using the string matcher 270, semantic matcher 280, and lexicon matcher 290. The term pair similarity score may then be determined by taking the maximum value of the string similarity score, semantic similarity score, and lexicon similarity score.

FIG. 5 illustrates an alternative method for calculating the term pair similarity score. The method in FIG. 5 begins at block 502, where the term pair is identified.

At block 504, a string similarity score may be calculated for the term pair. The string similarity score may be calculated, for example, using the string matcher 270 as previous described, or in various other ways.

After the string similarity score has been calculated for the term pair, the method may proceed to block 506. In block 506, it may be determined whether or not the string similarity score indicates an exact match of the term from the first textual statement and the term from the second textual statement. For example, where an analysis of the string similarity score shows that the string matcher 270 returned a value of "true" or "1," this may indicate a match of the term from the first textual statement and the term from the second textual statement. In some systems, the string matcher 270 may return a "true" or "1" value when the base or stemmed various of the terms are equal. Various other methods of determining whether or not the string similarity score indicates an exact match are possible.

If the determination is that that string similarity score does indicate an exact match, the method may proceed to block 508, where the term pair similarity score equals the string similarity score. In some systems, one or more of the semantic similarity score and lexicon similarity score cannot be greater than a value of "1." As such, since the string similarity score equals "1" and since the term pair similarity score may be the maximum of the string similarity score, the semantic similarity score, and the lexicon similarity score, it may be unnecessary to calculate the semantic similarity score or lexicon similarity score.

If, on the other hand, the determination indicates that the string similarity score does not indicate an exact match, the method may proceed to block 510. At block 510, the semantic similarity score for the term pair is calculated, such as with the semantic matcher 280 and using the semantic graph 282 as described. At block 512, the lexicon similarity score for the term pair is calculated, such as with the lexicon matcher 290 and using the lexicon 292 as described. Blocks 510 and 512 may be performed in either order or at the same time.

In block 514, the semantic similarity score may be compared to the lexicon similarity score. Where the semantic similarity score may be greater than the lexicon similarity score, the method may proceed to block 516, where the term pair similarity score is set to equal the semantic similarity score. Alternatively, where the semantic similarity score is not greater than the lexicon similarity score, the method may proceed to block 518, where the term pair similarity score is set to equal the lexicon similarity score.

Blocks 516 and 518 may be configured or set so that the term pair similarity score is set to equal the greater of the semantic similarity score and the lexicon similarity score. In some methods, the string similarity score may not be needed in the determination of block 514, such as where the string similarity score is configured to return only one of two values: "0" (or false) and "1" (or true). In these methods, because the string similarity score did not equal "1" and the method proceeded to blocks 510 and 512, the string similarity score must be equal to "0." As such, because the semantic similarity score and the lexicon similarity score may have a value between 0 and 1, the maximum of the string similarity score, the semantic similarity score, and the lexicon similarity score may be equal to the maximum of the semantic similarity score and the lexicon similarity score.

In some methods where one of the term pairs is a prepositional pair, the prepositional pair similarity score may be calculated using the additional formulas previously described, which may account for circumstances where one of the textual statements includes a prepositional term while the other does not. In other methods, this additional formula may not be incorporated. Other variations or methods of calculating the term pair similarity scores may be possible.

Returning to the method in FIG. 4, in block 408, the parsed word similarity score may be calculated based on the term pair similarity scores. Various methods, formulas, or algorithms may be used to calculate the parsed word similarity score. For example, the parsed word similarity score may be calculated by taking the product of the term pair similarity scores for each of the term pairs. Other methods of calculating the parsed word similarity score are possible.

In block 410, word vectors for the first textual statement and the second textual statement may be generated or otherwise created. Generation of a first textual statement word vector or a second textual statement word vector may be performed as previously described. The word vectors may be weighted. For example, in some methods, certain term types such as verbs, objects, and prepositions may be given a larger weight than other terms. Various other ways of generating or otherwise creating word vectors may be possible.

In block 412, a word vector similarity score may be calculated. The word vector similarity score may indicate or otherwise represent a similarity between the first textual statement word vector and the second textual statement word vector. The word vector similarity score may be calculated in various ways. For example, in some methods, the word vector similarity score may be calculated by taking the dot product of the first textual statement word vector and the second textual statement word vector. Various other examples or calculations are possible.

In block 414, an overall match score, such as match score 290, may be calculated. FIG. 6 illustrates one method of calculating the match score. In block 602, the parsed word similarity score for the term pairs may be calculated, such as in any of the manners previously discussed. In block 604, the word vector similarity score may be calculated, such as in any of the manners previously discussed. Blocks 602 and 604 may be performed in any order or at the same time.

At block 606, a comparison of the parsed word similarity score and the word vector similarity score may be performed. Where the comparison or determination indicates that the parsed word similarity score is greater than the word vector similarity score, the method may proceed to block 608, where the overall match score may be considered to be the parsed word similarity score. Where the comparison or determination indicates that the parsed word similarity score is not greater than the word vector similarity score, the method may proceed to block 610, where the overall match score may be considered to be the word vector similarity score. Blocks 606, 608, and 610 may be configured or otherwise designed so that the match score is equal to the maximum of the parsed word similarity score and the word vector similarity score. Various other ways of calculating the overall match score may be possible.

Blocks 404, 406, 408, 410, and 412 may be performed in various orders. In some systems, while blocks 404, 406, and 408 may need to be performed in the order shown in FIG. 4, and while blocks 410 and 412 may need to be performed in the order shown, the performance of any of these two sets of blocks may performed at any time or in any order. For example, blocks 404 and 410 may be performed initially or in various orders, while the calculations in blocks 406, 408, and 412 may be performed thereafter. In other systems blocks 410 and 412 may be performed prior to blocks 404, 406, and 408. Various other examples are possible.

The generation of a match score for a first textual statement and a second textual statement may be beneficial. For example, where match scores are generated for a first textual statement and each of several second textual statements, the match scores may then be compared to determine which of the several second textual statements most closely matches the first textual statement. As an example, a first textual statement "A" may be compared to second textual statements "B," "C," and "D," such as by performing the method of FIG. 4 once for each of the second textual statements "B," "C," and "D," to generate three match score $MS_B$, $MS_C$, and $MS_D$. By comparing the match scores, the system may determine which of the statements "B," "C," and "D" most closely match "A." Where, for example, $MS_D > MS_C > MS_B$, the system may determine that the textual statement "D" may be the closest match to the first textual statement "A," followed by the textual statement "C," with the textual statement "B" matching the least.

Figure 7:
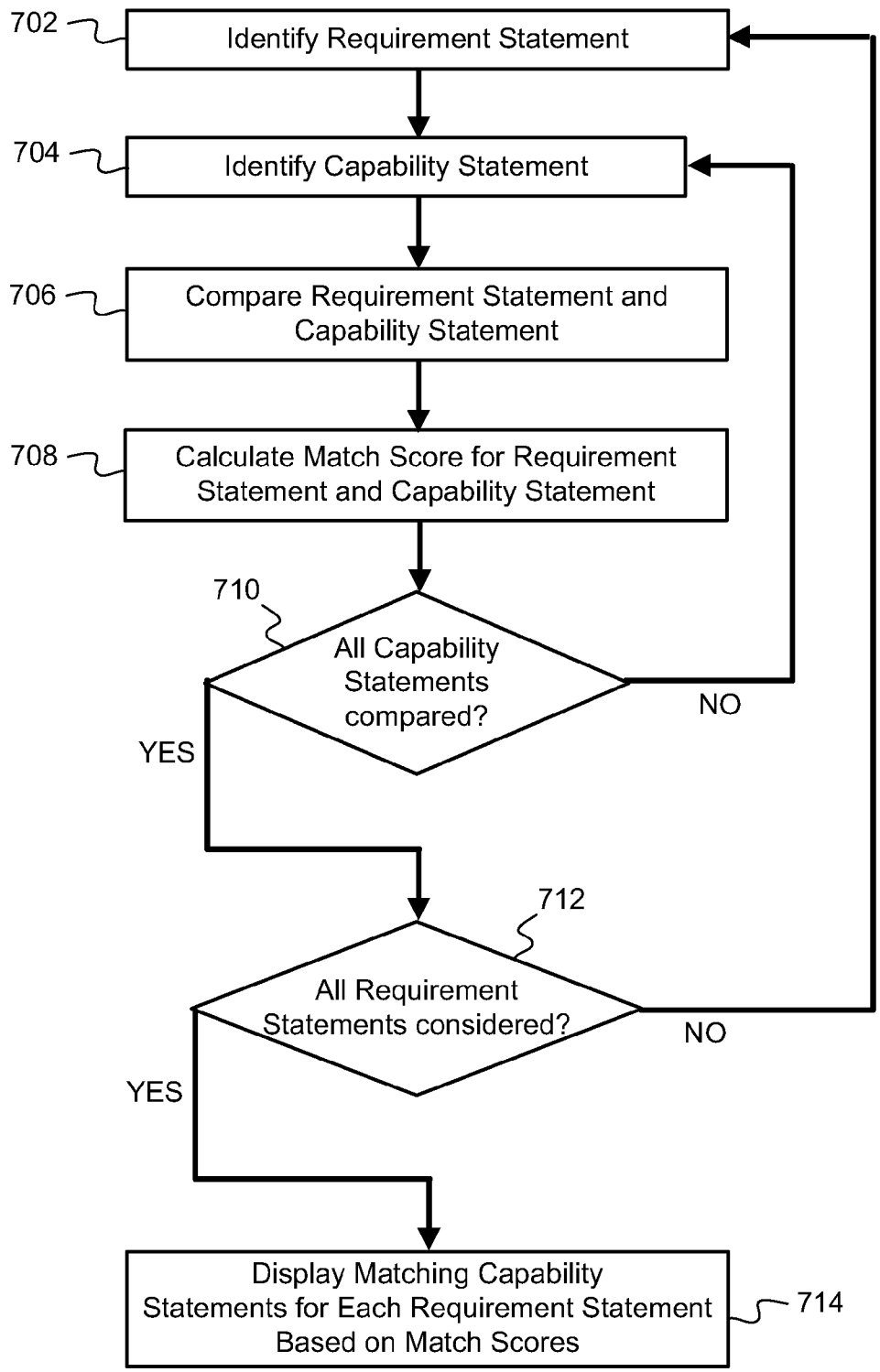
FIG. 7 shows an example of a method that may be used for identifying textual relationships.

FIG. 7 depicts one method of identifying textual relationship and displaying results based on the identification. The method of FIG. 7 is described as being used with requirement statements 210 and capability statements 205, but may be used with any system having one or more statements of a first type and one or more statements of a second type.

The method of FIG. 7 may be useful, for example, where an enterprise has offered a set of requirement statements 210. A system, such as matching system 200, may wish to compare the requirement statements 210 to one or more, such as each and every, capability statement 205 in a process model. Such a comparison may be desired, for example, to identify the capability statements 205 that most closely match each of the requirement statements 210.

The method may begin at block 702 where a first requirement statement 210 may be identified. This may be the first requirement statement 210 which the matching system 200 wishes to analyze or compare to capability statements in a process model.

At block 704, a first capability statement 205 may be identified. At block 706, the requirement statement 210 may be compared to the capability statement 205. At block 708, a match score for the requirement statement 210 and the capability statement 205 may be calculated or determined. Comparison of the requirement statement 210 and the capability statement 205 and calculation of a match score may be performed in various manners, such as those previously described.

At block 710, a determination may be made as to whether the first requirement statement 210 has been compared to each capability statement 205. Where capability statements 205 remain which have not yet been compared to the requirement statement 210, the method may return to block 704, where a new, previously uncompared capability statement 205 may be identified and compared to the requirement statement 210 to calculate a match score. This process may continue until all of the capability statements 205 have been compared to the requirement statement 210, and match scores have been calculated for each of the comparisons.

After all capability statements 205 have been compared to the requirement statement 210, the method may proceed to block 712, where a determination may be made as to whether or not all of the requirement statements 210 have been considered. Where one or more requirement statements 210 remain that have not yet been compared to any capability statements 205, the method may return to block 702 where a new, uncompared requirement statement 210 may be identified or otherwise selected. From block 702, the method may again proceed through blocks 704, 706, 708, and 710 until the new, uncompared requirement statement 210 has been compared to each and every capability statement 205.

When the new, uncompared requirement statement 210 has been compared to each and every capability statement 205 and match scores have been calculated for each comparison, the method may again return to block 712. This process may continue until all requirement statements 710 have been compared to all capability statements, with match scores for each comparison having been generated. At that point, the method may proceed to block 714.

At block 714, matching capability statements 205 may be displayed for each requirement statement 210 based on the calculated match scores. For example, where a requirement statement 210 was compared to capability statements "B," "C," and "D," generating three match score $MS_B$, $MS_C$, and $MS_D$, the system may determine that the capability statement "D" may be the closest match to the requirement statement 210, followed by the textual statement "C," with the textual statement "B" matching the least. One or more of the matched capability statements may be displayed for the requirement statement 210. In some systems, capability statement "D" would be displayed first, followed by capability statement "C" and lastly by capability statement "B."

In some systems, all capability statements 205 may be displayed for each requirement statement 210. In other systems, only capability statements 205 which generate a non-zero match score may be displayed for each requirement statement 210. In some systems, only a first number of matching capability statements, such as the ten capability statements 205 with the highest match scores, may be displayed for each requirement statement 210.

Figure 8:
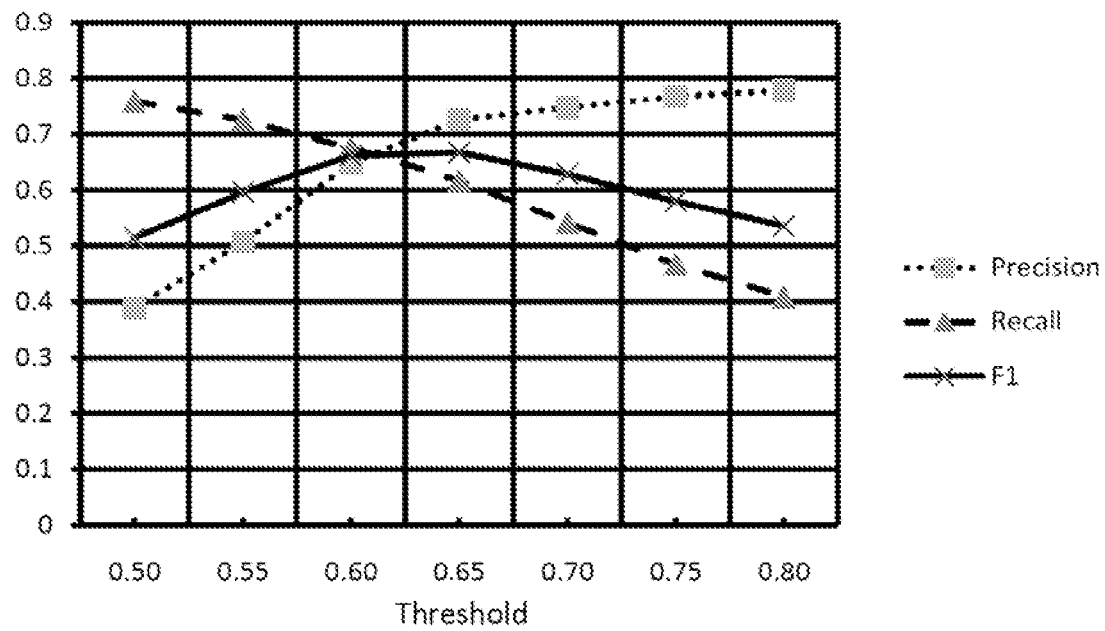
FIG. 8 shows information regarding thresholds and metrics related to example processes for identifying textual relationships.

In other systems, a threshold may be set, such that only those capability statements 205 with a match score above the threshold may be displayed for the requirement statement 210. For example, any matching capability statement with a match score of 0.625 or higher may be automatically mapped and shown or displayed to the user. In this example, a graph, such as the graph shown in FIG. 8, may aid in determining the threshold value. The graph in FIG. 8 illustrates experimental results using the matching system 200 to identify textual relationships, showing precision, recall, and F1 metrics based on various threshold values. The graph in FIG. 8 shows that at the threshold value of 0.625, high values for precision, recall, and F1 metrics may be achieved. Various other examples are possible.

Figure 9:
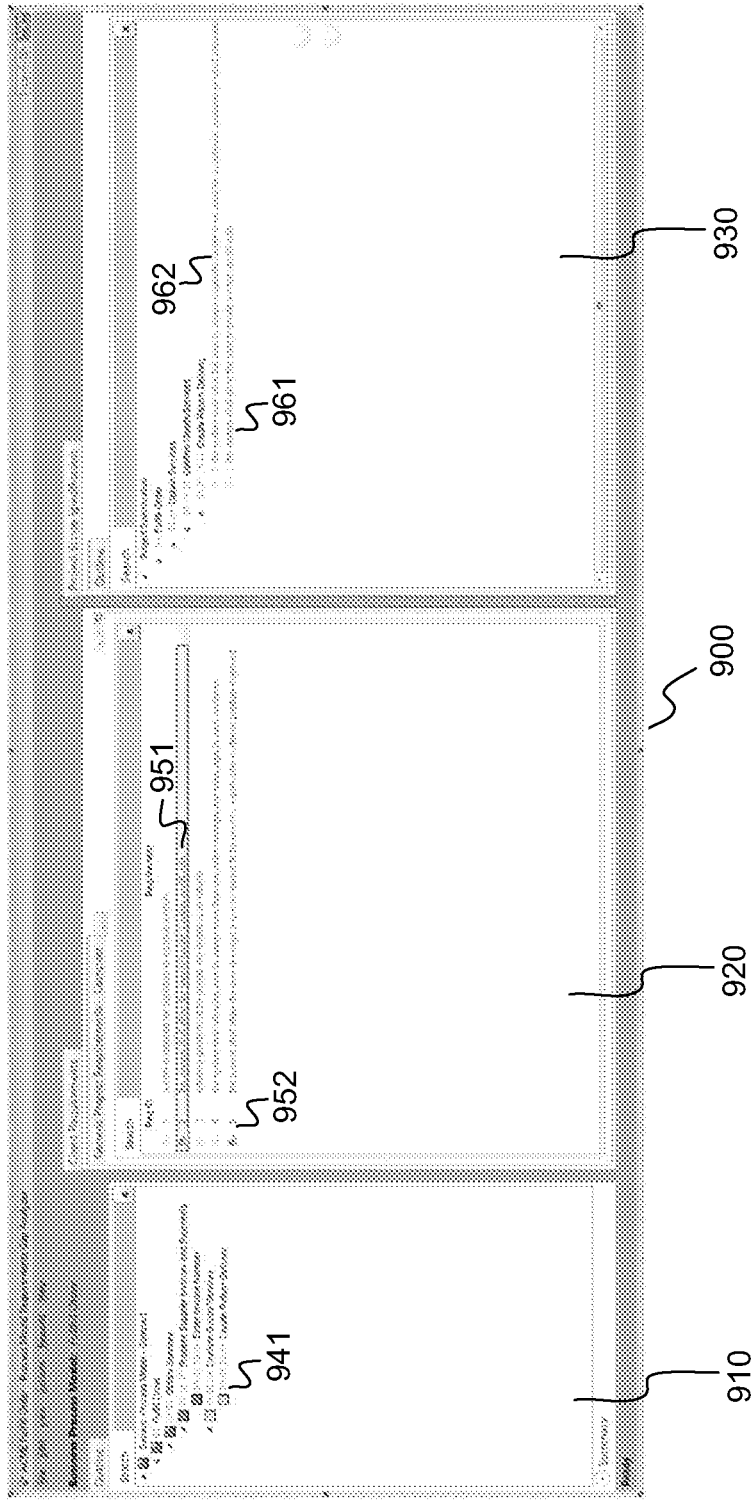
FIG. 9 shows a screenshot of an example interface for a system for identifying textual relationships.

FIG. 9 is a screen shot showing a graphical user interface 900, associated with a system for identifying textual relationships and mapping process model capabilities and client requirements into a project scope specification. The graphical user interface 900 may include one or more panels. For example, the graphical user interface 900 may include a project model display 910 showing a hierarchical arrangement of capabilities of a project model. The project model hierarchy may depict one or more sub-notes and one or more reusable requirements, such as requirements from the process model, standard requirements, or commonly used comments. A system associated with this graphical user interface 900 may read a user specified process model file and display its contents in the project model display 910.

The graphical user interface 900 may additionally or alternatively include a client requirements display 920, which may list or otherwise include one or more requirements specified by an enterprise or client. The graphical user interface 900 may also or alternatively include a project scope specification display 930 which may show a result of the mapped process model capabilities to the client requirements. The project scope specification display 930 may, for example, show process model elements which may be automatically mapped to one or more textual requirements. The project scope specification may, for example, have one or more nodes, reusable requirements, and common requirements.

As shown in FIG. 9, one or more capabilities of a project model, such as capability 941, may be listed in a project model display. Additionally, one or more textual requirements, such as requirements 951 and 952, may be shown in the client requirements display 920. In the example shown in FIG. 9, each of these requirements 951 and 952 may be automatically mapped to the capability 941, and displayed as mapped requirements 961 and 962 in the project scope specification display 930. The project scope specification may translate the mappings into a parent-child relationship where such a relationship exists. Various other examples are possible.

While the above described methods and systems may refer to a comparison or other determination as to whether one element is greater than or equal to a second element, in some embodiments one or more of these comparisons may be replaced by a comparison or other determination as to whether one element is greater than a second element. Similarly, comparisons or other determinations described as being "greater than" may also be replaced with "greater than or equal to." While the above described methods may refer to a comparison or other determination as to whether one element is less than or equal to a second element, in some embodiments one or more of these comparisons may be replaced by a comparison or other determination as to whether one element is less than a second element. Similarly, comparisons or other determinations described as being "less than" may also be replaced with "less than or equal to." Comparisons or other determinations made which require an element to "exceed" a second element may be replaced by comparisons or other determinations which require an element to "exceed or equal" a second element, and vice versa.

Figure 10:
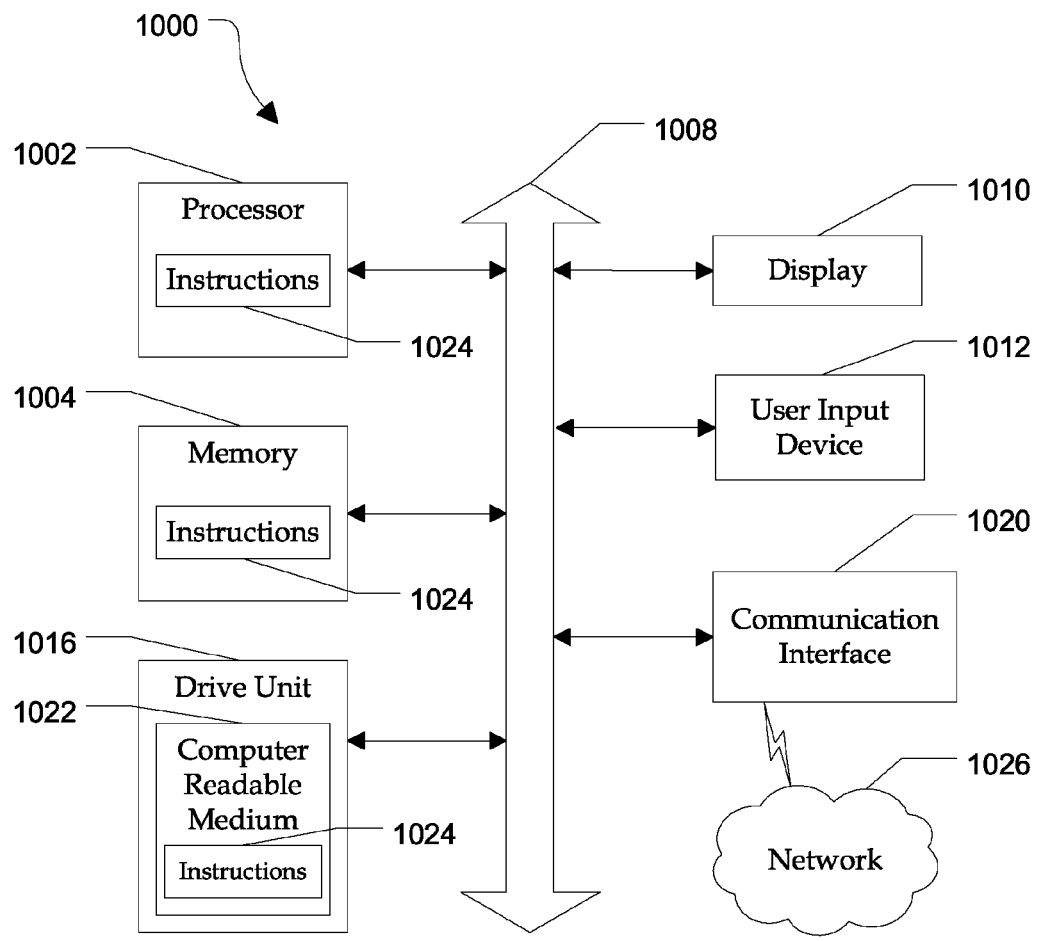
FIG. 10 shows an exemplary processing system for systems and methods for identifying textual relationships.

One or more of matching system 200, pre-processing module 220, dependency parser 230, term extractor 240, parsed term matcher 250, word vector matcher 260, string matcher 270, semantic matcher 280, lexicon matcher 290, semantic graph 282, and lexicon 292 may be or may include a portion or all of one or more computing devices of various kinds, such as the computing device in FIG. 10. FIG. 10 illustrates an example of a general computer system designated 1000. Any of the components from the matching system 200, pre-processing module 220, dependency parser 230, term extractor 240, parsed term matcher 250, word vector matcher 260, string matcher 270, semantic matcher 280, lexicon matcher 290, semantic graph 282, or lexicon 292 may include a portion or all of the computer system 1000. The computer system 1000 can include a set of instructions that can be executed to cause the computer system 1000 to perform any one or more of the methods or computer based functions disclosed. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The term "module" may be defined to include a plurality of executable modules. As described herein, the modules are defined to include software, hardware or some combination thereof executable by a processor, such as processor 1002. Software modules may include instructions stored in memory, such as memory 1004, or another memory device, that are executable by the processor 1002 or other processor. Hardware modules may include various devices, components, circuits, gates, circuit boards, and the like that are executable, directed, or otherwise controlled for performance by the processor 1002.

The computer system 1000 may include a memory 1004, such as a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1004 includes a cache or random access memory for the processor 1002. In alternative examples, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 1000 may or may not further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1016.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

The computer system 1000 may also include a disk or optical drive unit 1016. The disk drive unit 1016 may include a computer-readable medium 1022 in which one or more sets of instructions 1024, e.g. software, can be embedded. Further, the instructions 1024 may embody one or more of the methods or logic as described. In a particular example, the instructions 1024 may reside completely, or at least partially, within the memory 1004 or within the processor 1002 during execution by the computer system 1000. The memory 1004 and the processor 1002 also may include computer-readable media as discussed above.

The present disclosure contemplates a computer-readable medium that includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020 or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection or may be established wirelessly as discussed later. Likewise, the additional connections with other components of the system 1000 may be physical connections or may be established wirelessly. The network 1026 may alternatively be directly connected to the bus 1008.

The network 1026 may include wired networks, wireless networks, Ethernet AVB networks, or combinations thereof. The wireless network may be a cellular telephone network, an 802.11, 802.16, 802.20, 802.1Q or WiMax network. Further, the network 1026 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

An evaluation of the systems and methods of identifying textual relationships was performed on a requirements document from a project team who wanted to map their requirements to an industry-specific process model. The project was from a chemicals company and the requirements covered different aspects to their multi-national supply chain process such as accepting customer orders, fulfilling the orders, invoicing for the order and shipping the orders. Some of the requirements were about Order-to-Cash requirements, while others included aspects in them such as dealing with dangerous goods and manufacturing. The client requirements were mapped to a standardized "ERP Process Model for the Chemical Industry" created by a different group. The process model used included 3116 capabilities. The client provided a document with 189 requirements. The requirements provided by the client were used as-is, so some requirements were well-formed while others were not.

Two kinds of experiments were performed. For the first experiment, the matching system 200 was compared to a number of other approaches. For the second experiment, a case study with 6 potential users was conducted. Half of the 6 potential users manually mapped requirements to the process model, while the other half mapped it using the matching system 200 as a starting point.

Both the experimental results were evaluated using a gold standard developed by three domain experts. The team of three domain experts created a gold standard collaboratively in a democratic manner. For a requirement, each member suggested all the different mappings it had to the process model. For a mapping to be accepted in the gold standard, agreement at least two of the three members was needed. The gold standard contained 334 mappings between the requirements and the process model capabilities. Out of the 189 requirements, 42 requirements were not mapped to any capability, because they did not have any corresponding capabilities in the process model. Additionally, many requirements were mapped to more than one process model capability.

Three standard IR parameters were used in evaluating the results of the experiments: precision, recall and f-measure. To calculate these parameters, the mappings generated by the matching system 200 or humans were classified as one of the following:

1) True Positive(T P): A mapping (generated by the matching system 200 or manually) is considered a True Positive if it already exists in the gold standard.
2) False Positive(F P): A mapping (generated by the matching system 200 or manually) is considered a False Positive if it does not exist in the gold standard.
3) False Negative(F N): A mapping that exists in the gold standard, but is not generated is considered a False Negative.

Based on these classifications, the precision was calculated as $$\left(\frac{TP}{TP+FP}\right).$$

Recall was calculated as:

$$\left(\frac{TP}{TP+FN}\right).$$

f-measure (F1) was calculated as the harmonic mean of precision and recall.

Table V below shows precision, recall and F1 score results for the first experiment for different matching strategies. The results of Table V illustrate that the fifth approach tried (Weighted Cosine+VOP+Semantic Graphs), which was used by the matching system 200 for matching requirements against capabilities, yielded better F1 scores than any other strategy.

TABLE V

| | Approach | Precision | Recall | F1 |
|---|---|---|---|---|
| 1 | TF-IDF | 0.16 | 0.03 | 0.05 |
| 2 | Sentence Similarity [20] | 0.11 | 0.33 | 0.17 |
| 3 | Weighted Cosine + Semantic Graph [9] | 0.87 | 0.27 | 0.41 |
| 4 | Weighted Cosine + YOP | 0.74 | 0.37 | 0.49 |
| 5 | Weighted Cosine + YOP + Semantic Graph | 0.73 | 0.62 | 0.67 |

The first approach, based on our implementation of TF-IDF (Term Frequency Inverse Document Frequency) based cosine similarity, produced very low scores in both precision (0.16) and recall (0.03). Two possible reasons exists for these low scores: 1) The first approach did not use domain-specific information and 2) Using IDF decreases the weight of frequently used terms, but for this matching problem, frequently used terms are important since most capabilities represent different kinds of operations of similar objects such as invoice.

The second approach was based generally on a lexicon similarity score as described above, and produced a higher recall (0.33) because it used a language tool such as lexicon 292. However, the second approach still suffered from poor precision (0.11). This is because a general purpose lexical database like the lexicon 292 may not be enough to disambiguate between domain specific entities (objects), such as the ones used in the requirements and the process model.

The third approach, using a weighted cosine with semantic graphs, produced high precision (0.87) and slightly lower recall (0.27) than the Sentence Similarity based approach. This shows the value of the domain-specific semantic model.

In the fourth approach (Weighted Cosine+VOP), the introduction of VOP improves the recall (0.37) significantly while keeping a higher precision (0.74). This may demonstrate that VOP gives importance to the structure of the sentence in ways superior to the first three approaches, and therefore helps to find more correct mappings.

Finally, the fifth approach (Weighted Cosine+VOP+Semantic Graphs), as implemented and used in matching system 200, combines the benefits of using a Semantic Graph along with rule based parsing and cosine similarity and maintains a high precision (0.73) with the highest recall (0.62). We experimentally determined the threshold for approach to be 0.625 based on the curves for precision and recall shown in FIG. 8.

The second experiment was a case study to identify, determine, or verify if there is statistical evidence that demonstrates that users find more mapping (higher recall) that are more accurate (higher precision) with the help of matching system 200 than with a manual approach. For this study, six participants with varying amounts of experience and knowledge about the chemical industry were used. Three of them were randomly chosen to perform the task of mapping the requirements document to the process model. They were given a requirements document and a process model in two tabs of a Microsoft Excel sheet and were free to use keyword based search provided by Excel. The other three were asked to perform the same task with the help of the matching system 200, i.e., their starting point was a set of mappings generated by the matching system 200, provided through interfaces and displays provided by the matching system 200 similar to those shown in FIGS. 9-16.

Null and Alternate hypotheses were introduced in the second experiment to study a directionality of means of precision and recall for the group using the matching system 200 and the group creating the mapping manually.

Null Hypothesis $Hr_0$: $\mu_{recall}^{ProcGap} - \mu_{recall}^{Manual} \leq 0$

Alternate Hypothesis $Hr_a$: $\mu_{recall}^{ProcGap} - \mu_{recall}^{Manual} > 0$ Null Hypothesis $Hp_0$: $\mu_{precision}^{ProcGap} - \mu_{precision}^{Manual} \leq 0$ Alternate Hypothesis $Hp_a$: $\mu_{precision}^{ProcGap} - \mu_{precision}^{Manual} > 0$ Table VI, shown below, illustrates the precision, recall and F1 scores for the six participants from the second experiment.

TABLE VI

|  | Participant 1 | | | Participant 2 | | | Participant 3 | | | Average | | |
| --- | --- | --- | --- | --- | --- | --- | --- | --- | --- | --- | --- | --- |
|  | Precision | Recall | F1 | Precision | Recall | F1 | Precision | Recall | F1 | Precision | Recall | F1 |
| User Group with System | 0.87 | 0.68 | 0.76 | 0.77 | 0.72 | 0.74 | 0.78 | 0.73 | 0.75 | 0.81 | 0.71 | 0.75 |
|  | Participant 4 | | | Participant 5 | | | Participant 6 | | | Average | | |
|  | Precision | Recall | F1 | Precision | Recall | F1 | Precision | Recall | F1 | Precision | Recall | F1 |
| User Group with manual approach | 0.29 | 0.04 | 0.08 | 0.37 | 0.08 | 0.13 | 0.37 | 0.04 | 0.08 | 0.34 | 0.06 | 0.09 |

The average recall by the group that used matching system 200 was 0.71 and the average recall by the group that created the mappings manually was 0.06. Table VI shows that users were able to find significantly more mappings with the help of the matching system 200. There may be at least two reasons for these positive results: 1) users may be overwhelmed by the size of the requirements document and capability model; and 2) users may not be able to get beyond simple keyword search, only getting the most obvious results.

Table VI also shows that the average precision by the group that used the matching system 200 was 0.81 while the average precision by the group that created the mappings manually is 0.34. This may be explained by the fact that the users may go for the most obvious match and may not apply any thresholds or order any possible results by a match score. Another reason for better recall by the group using the matching system 200 may be that the matching system 200 may have presented a number of other mappings in the same local regions of the process model, which they were able to easily find.

A pairwise T-test at a 0.01 level of significance was performed for the values for recall for both the groups. The t value (0.000114) was found to be less than the level of significance (0.01), and so the null hypothesis $Hr_0$ was rejected in light of the results, allowing for a conclusion that $Hr_a$ is true. A pairwise T-test at a 0.01 level of significance was also performed for the values for precision for both the groups. The t value ($1.19 \times 10^{-6}$) was found to be less than the level of significance (0.01), and so the null hypothesis $HP_0$ was rejected in light of the results, allowing for a conclusion that $HP_a$ is true. Both the populations were normally distributed with the equal (true) variance. Hence the ratio between the larger standard deviation and the smaller standard deviation was less than 2. As such, it can be concluded that the results were statistically significant. The case study allowed for a rejection of the null hypotheses—$Hr_0$ and $Hp_0$, and an acceptance of the null hypotheses—$Hr_a$ and $H_a$. As such, the results supported a conclusion that the group using the matching system 200 significantly outperformed the manual group, both in terms of precision and recall.

While the second experiment only included six participants, the size of the requirements document and process model was substantially large, and both the groups also had very low standard deviation. Additionally, the users were only given two hours to perform the mapping, though it is believed that the time is representative of the amount of time project team members may normally be able to dedicate to this task.

The matching system 200 and methods described herein may differ from previous references and provide one or more benefits, such as:

1) The matching system 200 use a combination of NLP and IR techniques to provide a benefit from both types of approaches and handle requirements that are well written and can easily be parsed, such as using a NLP parser, or requirements that are poorly written or complex and cannot be parsed, such as using an IR technique.
2) The matching system 200 includes a developed rule based approach to leverage a dependency tree. This allows handling some linguistic complexity that an approach based on syntactic/shallow parsing alone may not be able to handle.
3) The matching system 200 may use and leverage a semi-automatically generated semantic graph 282 representing domain knowledge to assist with the matching.

The matching system 200 and the methods herein may use dependency parsing as well as leveraging of a semantic graph 282, in addition to a lexicon 292, to perform matching. Additionally, the matching system 200 and methods may employ word vector matching, such as cosine similarity, for matching sentences that hard to syntactically parse. The addition of parsed word matching, such as with the VOP matching which may be performed by a parsed term matcher 250, with the use of word vector matching, may allow the matching system 200 to perform better than by just using word vector matching.

The matching system 200 and methods may help users map natural language requirements to process models. The matching system 200 and methods may use a combination of NLP techniques and IR techniques, creating and building on tools such as a dependency parser 230, semantic graph 282 and lexicon 292 to extract structured content from requirements and map it to process model elements. Two possible aspects to the present approach may include: 1) using a combination of IR and rule based techniques over dependency parsing that allow the matching system 200 to automatically match both well-formed or poorly formed requirements and capabilities; and 2) leveraging a semi-automatically generated semantic graph 282 that may be more suited for the domain-specific process models than a general purpose lexicon or other lexicon 292.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

We claim:

1. A computer-implemented method for identifying textual statement relationships, the method comprising:
   identifying a textual statement pair that includes a first textual statement and a second textual statement, the first textual statement comprising a first set of words and the second textual statement comprising a second set of words;

removing, by a pre-processing module, non-alpha numeric characters from the first textual statement and the second textual statement;

communicating, by the pre-processing module, the pre-processed first textual statement and second textual statement to a processor;

extracting, by the processor, a first parsed word group from the first textual statement and a second parsed word group from the second textual statement, wherein each parsed word group is a verb-object-preposition (VOP) triple including a verb, an object, and a preposition from each respective textual statement;

comparing, for the textual statement pair, the first parsed word group and the second parsed word group; and calculating, through the use of the processor, a parsed word score for the textual statement pair, wherein the parsed word score is based on the comparison of the first parsed word group and the second parsed word group;

determining a match score for the textual statement pair based on the parsed word score wherein calculating the parsed word score for the textual statement pair comprises:

extracting, through the use of the processor, a parsed word group pair from the textual statement pair, wherein the parsed word group pair includes a plurality of term pairs, the plurality of term pairs including a verb pair comprising a verb from the VOP triple for the first word group and a verb from the VOP triple for the second word group, an object pair comprising an object from the VOP triple for the first word group and an object from the VOP triple for the second word group, and a preposition pair comprising a preposition from the VOP triple for the first word group and a preposition from the VOP triple for the second word group;

calculating a verb pair sub-score, an object pair sub-score, and a preposition pair sub-score, the calculation of each pair sub-score based on a string similarity, a semantic similarity, and a lexicon similarity between each verb, object, or preposition of the respective verb pair, object pair, or preposition pair; and wherein the parsed word score is the product of at least one of the verb pair sub-score, the object pair sub-score, and the preposition pair sub-score;

generating, by the processor, a user interface configured to depict one or more first textual statements and one or more second textual statements along with one or more match indicators that visually indicate a match between one or more of the first textual statements and one or more of the second textual statements;

communicating, by a graphics processor in communication with the processor and a display the generated user interface to thereby cause the display to visually display the generated user interface.

2. The method of claim 1, wherein the first textual statement is selected from a first set of textual statements, and wherein the second textual statement is selected from a second set of textual statements.

3. The method of claim 2, wherein the first set of textual statement is a set of requirement statements and the second set of textual statements is a set of process model capabilities.

4. The method of claim 3, wherein match scores are determined for a plurality of textual statement pairs, each textual statement pair including one requirement statement from the set of requirement statements and one capability statement from the set of process model capabilities.

5. The method of claim 4, further comprising visually displaying, for each requirement statement, a list of capability statements included in textual statement pairs that also include the requirement statement.

6. The method of claim 5, wherein each list of the capability statements is ordered based on the match score for the textual statement pair that includes the requirement statement and the respective capability statement.

7. The method of claim 1, wherein
calculating the verb pair sub-score, the object pair sub-score, and the preposition pair sub-score comprises:
calculating a string similarity score, the string similarity score based on a string comparison of a base word of each verb, object, or preposition of the verb pair, object pair, or preposition pair, respectively;
calculating a semantic similarity score, the semantic similarity score based on a semantic relationship between each verb, object, or preposition of the verb pair, object pair, or preposition pair;
calculating a lexicon similarity score, the lexicon similarity score based on relative positions in a taxonomy of each verb, object, or preposition of the verb pair, object pair, or preposition pair; and
comparing the string similarity score, the semantic similarity score, and the lexicon similarity, wherein the pair sub-score is based on at least one of the string similarity score, the semantic similarity score, and the lexicon similarity score; and
wherein the parsed word score is the product of at least one of the verb pair sub-score, the object pair sub-score, and the preposition pair sub-score.

8. The method of claim 1, wherein
calculating the verb pair sub-score, the object pair sub-score, and the preposition pair sub-score comprises:
calculating a string similarity score, the string similarity score based on a string comparison of a base word of each verb, object, or preposition of the verb pair, object pair, or preposition pair, respectively;
calculating a semantic similarity score and a lexicon similarity score when the string similarity score does not indicate a string match of a base word of each verb, object, or preposition of the verb pair, object pair, or preposition pair, respectively;
comparing the semantic similarity score and the lexicon similarity score when the string similarity score does not indicate a string match of a base word of each verb, object, or preposition of the verb pair, object pair, or preposition pair, respectively;
wherein the sub-score is the string similarity score when the string similarity score indicates a string comparison of a base word of each verb, object, or preposition of the verb pair, object pair, or preposition pair respectively; and
wherein the sub-score is a maximum of the semantic similarity score and the lexicon similarity score when the string similarity score does not indicate a string match of a base word of each verb, object, or preposition of the verb pair, object pair, or preposition pair respectively; and
wherein the parsed word score is the product of at least one of the verb pair sub-score, the object pair sub-score, and the preposition pair sub-score.

9. The method of claim 1, wherein calculating the verb pair sub-score, the object pair sub-score, and the preposition pair sub-score comprises:
calculating a string similarity score, the string similarity score based on a string comparison of a base word of each verb, object, or preposition of the verb pair, object pair, or preposition pair, respectively; and using the string similarity score as the pair sub-score when the string similarity score indicates a string comparison of a base word of each verb, object, or preposition of the verb pair, object pair, or preposition pair, respectively.

10. The method of claim 1, further comprising:
creating a first word vector based on the first set of words;
creating a second word vector based on the second set of words;
comparing, for the textual statement pair, the first word vector and the second word vector; and
calculating, through the use of the at least one processor, a word vector score for the textual statement pair, wherein the word vector score is based on the comparison of the first word vector and the second word vector; and
determining the match score for the textual statement pair based on the word vector score.

11. The method of claim 10, wherein the word vector score for the textual statement pair is based on the first word vector and the second word vector.

12. The method of claim 10, wherein the first word vector includes a numerical value for each of the first set of words, and wherein the second word vector includes a numerical value for each of the second set of words.

13. The method of claim 12, wherein a numerical value for a word from the first or second set of words is increased when the word is a verb, object, or preposition.

14. A system for textual statement relationship identification, the system comprising:
a database configured to store a first set of textual statements and a second set of textual statements;
a text analysis system comprising a pre-processing module, a processor, non-transitory computer readable storage medium, and a graphics processor wherein:
the pre-processing module is configured to remove non-alpha numeric characters from one or more textual statements;
the processor is in communication with the pre-processing module and is configured to receive pre-processed textual statements;
the non-transitory computer readable storage medium has stored therein data instructions executable by the processor to cause the processor to perform acts of:
identifying a textual statement pair that includes a first textual statement and a second textual statement, the first textual statement comprising a first set of words and the second textual statement comprising a second set of words;
extracting a parsed word group pair from the textual statement pair, where the parsed word group pair includes a first parsed word group from the first textual statement and a second parsed word group from the second textual statement, wherein the parsed word group pair includes a plurality of term pairs, the plurality of term pairs including a verb pair comprising a verb from the first word group and a verb from the second word group, an object pair comprising an object from the first word group and an object from the second word group, and a preposition pair comprising a preposition from the first word group and a preposition from the second word group;
comparing, for the textual statement pair, the first parsed word group and the second parsed word group;
calculating a verb pair sub-score, an object pair sub-score, and a preposition pair sub-score based on comparison of the textual statement pair, the first parsed word group and the second parsed word group;
calculating, a parsed word score for the textual statement pair, wherein the parsed word score is based on comparison of the first parsed word group and the second parsed word group wherein the parsed word score is a product of at least one of the verb pair sub-score, the object pair sub-score, and the preposition pair sub-score;
determining a match score for the textual statement pair based on the parsed word score; and
generating a user interface configured to depict one or more first textual statements and one or more second textual statements along with one or more match indicators that visually indicate a match between one or more of the first textual statements and one or more of the second textual statements;
communicating the generated user interface to the graphics processor; and
the graphics processor is in communicating with a display to thereby cause the display to visually display the generated user interface.

15. The system of claim 14, wherein the first textual statement is a requirement statement selected from a set of requirement statements, and wherein the second textual statement is a capability statement selected from a set of process model capabilities.

16. The system of claim 15, wherein the instructions to determine the match score comprises instruction to determine a plurality of match scores for a plurality of textual statement pairs, each textual statement pair including one requirement statement from the set of requirement statements and one capability statement from the set of process model capabilities.

17. The system of claim 16, wherein the storage medium further comprises instructions to visually display, for each requirement statement, a list of capability statements included in textual statement pairs that also include the requirement statement.

18. The system of claim 17, wherein the storage medium further comprises instructions to order each list of the capability statements based on the match score for the textual statement pair that includes the requirement statement and the respective capability statement.

19. The system of claim 14, wherein each parsed word group is a verb-object-preposition (VOP) triple including a verb, an object, and a preposition from each respective textual statement.

20. The system of claim 19, wherein the instructions to calculate the parsed word score for the textual statement pair comprises:
instructions to calculate a verb pair sub-score, an object pair sub-score, and a preposition pair sub-score, the calculation of each pair sub-score comprising:
instructions to calculate a string similarity score, the string similarity score based on a string comparison of a base word of each verb, object, or preposition of the verb pair, object pair, or preposition pair respectively;
instructions to calculate a semantic similarity score, the semantic similarity score based on a semantic relationship between each verb, object, or preposition of the verb pair, object pair, or preposition pair;
instructions to calculate a lexicon similarity score, the lexicon similarity score based on relative positions in a taxonomy of each verb, object, or preposition of the verb pair, object pair, or preposition pair; and instructions to compare the string similarity score, the semantic similarity score, and the lexicon similarity, wherein the pair sub-score is based on at least one of the string similarity score, the semantic similarity score, or the lexicon similarity score.

21. The system of claim 14, wherein the storage medium further comprises:
instructions to calculate, through the use of the at least one processor, a word vector score for the textual statement pair, wherein the word vector score is based on the comparison of a first word vector and a second word vector, the first word vector based on the first set of words and the second word vector based on the second set of words;
instructions to compare the word vector score and the parsed word score; and
instructions to calculate the match score based on the greater of the word vector score and the parsed word score.

22. The system of claim 21, wherein the word vector score for the textual statement pair is based on the first word vector and the second word vector.

23. The system of claim 21, wherein the first word vector includes a numerical value for each of the first set of words, and wherein the second word vector includes a numerical value for each of the second set of words, and wherein a numerical value for a word from the first or second set of words is increased when the word is a verb, object, or preposition.

24. A processor configured to calculate a match score for a textual statement pair, the processor comprising:
pre-processing hardware logic configured to remove non-alpha numeric characters from a first textual statement and a second textual statement of the textual statement pair, and to communicate the pre-processed textual statement pair to term extractor circuitry;
term extractor circuitry configured to receive the pre-processed textual statement pair and to extract a parsed word group pair from the pre-processed textual statement pair, the parsed word group pair including a plurality of term pairs, wherein the term pairs include a verb pair comprising a verb from each textual statement from the textual statement pair, an object pair comprising an object from the each textual statement, and a preposition pair comprising a preposition from the each textual statement;
a parsed term matcher circuitry including:
a string matcher circuitry configured to calculate a string similarity score for each term pair;
a semantic matcher circuitry configured to calculate a semantic similarity score for each term pair;
a lexicon matcher circuitry configured to calculate a lexicon similarity score for each term pair; and
wherein the parsed term matcher circuitry is configured to calculate a sub-score for each verb pair, object pair, and preposition pair based on at least one of the corresponding string similarity score, the corresponding semantic similarity score, and the corresponding lexicon similarity score;
wherein the parsed term matcher circuitry is configured to calculate a parsed word score for the textual statement pair based on at least one of the verb pair sub-score, the object pair sub-score, and the preposition pair sub-score; and
user interface circuitry configured to generate a user interface that depicts one or more first textual statements and one or more second textual statements along with one or more match indicators that visually indicate a match between one or more of the first textual statements and one or more of the second textual statements, and
a graphics processor in communication with the process configured to communicate the generated user interface to a display to thereby cause the display to visually display the generated user interface.

25. The processor of claim 24, further comprising:
a word vector matcher;
wherein the term extractor circuitry is configured to generate a word vector for each textual statement of the textual statement pair; and
wherein the word vector matcher circuitry is configured to compare the generated word vectors and calculate a word vector score based on the comparison.

26. The processor of claim 25, wherein the processor is configured to calculate the match score for the textual statement pair based on at least one of the parsed word score and the word vector score.

27. The processor of claim 24, wherein the plurality of term pairs include the verb pair comprising a verb from a verb-object-preposition (VOP) triple for a first word group from the parsed word group pair and a verb from the VOP triple for a second word group from the parsed word group pair, the object pair comprising an object from the VOP triple for the first word group and an object from the VOP triple for the second word group, and the preposition pair comprising a preposition from the VOP triple for the first word group and a preposition from the VOP triple for the second word group.

28. The processor of claim 27, wherein the parsed term matcher circuitry calculates the verb pair sub-score, the object pair sub-score, and the preposition pair sub-score, the calculation comprising:
determination, by the string matcher circuitry, the string similarity score for each term pair, the string similarity score based on a string comparison of a base word of each verb, object, or preposition of the verb pair, object pair, or preposition pair respectively;
determination, for each term pair, the semantic similarity score by the semantic matcher circuitry and the lexicon similarity score with the lexicon matcher circuitry when the string similarity score does not indicate a string match of a base word of each verb, object, or preposition of the verb pair, object pair, or preposition pair, respectively;
comparison of the semantic similarity score and the lexicon similarity score when the string similarity score does not indicate a string match of a base word of each verb, object, or preposition of the verb pair, object pair, or preposition pair, respectively; and
identification of the string similarity score as the sub-score when the string similarity score indicates a string comparison of a base word of each verb, object, or preposition of the verb pair, object pair, or preposition pair, respectively.

29. The processor of claim 27, wherein calculating the sub-score for each term pair comprises:
identifying a maximum of the semantic similarity score and the lexicon similarity score as the term pair sub-score in response to the string similarity score of the term pair representative of the term pair comprising different base words.

* * * * *